United States Patent
Hagen et al.

(10) Patent No.: US 10,969,336 B2
(45) Date of Patent: *Apr. 6, 2021

(54) OPTICAL SIGNAL DETECTION MODULE

(71) Applicant: Gen-Probe Incorporated, San Diego, CA (US)

(72) Inventors: Norbert D. Hagen, Carlsbad, CA (US); David Opalsky, San Diego, CA (US); George T. Walker, San Diego, CA (US); Byron J. Knight, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 15/176,867

(22) Filed: Jun. 8, 2016

(65) Prior Publication Data
US 2016/0363534 A1 Dec. 15, 2016

Related U.S. Application Data

(60) Provisional application No. 62/173,045, filed on Jun. 9, 2015.

(51) Int. Cl.
*G01N 21/64* (2006.01)
*G01N 21/27* (2006.01)

(52) U.S. Cl.
CPC .......... *G01N 21/64* (2013.01); *G01N 21/276* (2013.01); *G01N 21/645* (2013.01)

(58) Field of Classification Search
CPC ..... G01N 21/64; G01N 21/276; G01N 21/645
See application file for complete search history.

(56) References Cited

U.S. PATENT DOCUMENTS

| 9,540,701 B2 | 1/2017 | Olesberg et al. |
| 2008/0316483 A1 | 12/2008 | Tai et al. |

(Continued)

FOREIGN PATENT DOCUMENTS

| EP | 1950554 A1 | 7/2008 |
| EP | 2787351 A1 | 10/2014 |

(Continued)

OTHER PUBLICATIONS

PCT International Search Report and Written Opinion, International Application No. PCT/US2016/036439, dated Nov. 15, 2016.

(Continued)

*Primary Examiner* — Christine S. Kim
(74) *Attorney, Agent, or Firm* — Sterne, Kessler, Goldstein & Fox P.L.L.C.; Charles B. Cappellari

(57) ABSTRACT

An optical signal detection module includes an optical measurement device (OMD) configured to detect an optical emission signal from an emission signal source placed in a signal-detecting position of the OMD. The optical signal detection module also includes a cover moveable between a closed position covering the signal-detecting position and an open position not covering the signal-detecting position. The cover includes an optical reference material that emits a reference emission detectable by the OMD. The cover is configured so that, when the cover is in the closed position, the inner surface is in the signal-detecting position of the OMD so that the OMD detects the reference emission. The optical signal detection module can also include a drive assembly coupled to the cover and configured to move the cover between the open position and the closed position. In some embodiments, the OMD can include a fluorometer.

19 Claims, 12 Drawing Sheets

(56) References Cited

U.S. PATENT DOCUMENTS

| | | | |
|---|---|---|---|
| 2011/0148764 A1* | 6/2011 | Gao | G06F 3/0317 345/163 |
| 2011/0160073 A1* | 6/2011 | Kordunsky | B01L 7/52 506/9 |
| 2012/0053434 A1* | 3/2012 | Saito | A61B 1/00009 600/324 |
| 2013/0016337 A1 | 1/2013 | Gardner et al. | |
| 2013/0016347 A1* | 1/2013 | Gono | A61B 1/0017 356/243.1 |
| 2013/0344613 A1 | 12/2013 | Li et al. | |
| 2014/0038192 A1 | 2/2014 | Buse et al. | |
| 2015/0018645 A1* | 1/2015 | Farkas | A61B 90/96 600/317 |
| 2015/0377769 A1* | 12/2015 | Zeng | G01N 21/278 356/326 |
| 2016/0131586 A1 | 5/2016 | Gardner et al. | |
| 2016/0363532 A1 | 12/2016 | Hagen et al. | |

FOREIGN PATENT DOCUMENTS

| | | |
|---|---|---|
| JP | 2004-144839 A | 5/2004 |
| JP | 2005-516596 A | 6/2005 |
| JP | 2006-267099 A | 10/2006 |
| JP | 2007-504477 A | 3/2007 |
| JP | 2007-519947 A | 7/2007 |
| JP | 2008-519266 A | 6/2008 |
| JP | 2008-532048 A | 8/2008 |
| JP | 2010-117712 A | 5/2010 |
| JP | 2011-502937 A | 1/2011 |
| JP | 2011-241947 A | 12/2011 |
| JP | 2012-047719 A | 3/2012 |
| JP | 2012-226055 A | 11/2012 |
| JP | 2014-142244 A | 8/2014 |
| WO | 2004/104547 A2 | 12/2004 |
| WO | 2011/016509 A1 | 2/2011 |
| WO | 2014/021820 A2 | 2/2014 |
| WO | 2014/022532 A2 | 2/2014 |
| WO | 2014/029538 A2 | 2/2014 |
| WO | 2014/100725 A1 | 6/2014 |
| WO | 2014/149875 A2 | 9/2014 |
| WO | 2014/153193 A2 | 9/2014 |
| WO | 2014/159066 A2 | 10/2014 |

OTHER PUBLICATIONS

PCT International Preliminary Report on Patentability, International Application No. PCT/US2016/036439, dated Dec. 21, 2017.

USPTO, Non-Final Office Action, U.S. Appl. No. 15/176,861, dated Sep. 26, 2018.

USPTO Notice of Allowance, U.S. Appl. No. 15/176,851, dated Jun. 14, 2019.

USPTO Non-Final Rejection, U.S. Appl. No. 16/658,482, dated Sep. 11, 2020.

JPO Official Action, Japanese Patent Application No. 2017-559839, dated Feb. 13, 2020.

* cited by examiner

| Interface Position | Reformatter Position |
|---|---|
| T1 | F21 |
| T2 | F20 |
| T3 | F19 |
| T4 | F18 |
| T5 | F17 |
| T6 | F26 |
| T7 | F25 |
| T8 | F16 |
| T9 | F14 |
| T10 | F13 |
| T11 | F27 |
| T12 | F24 |
| T13 | F23 |
| T14 | F12 |
| T15 | F11 |
| T16 | F28 |
| T17 | F32 |
| T18 | F6 |
| T19 | F9 |
| T20 | F10 |
| T21 | F30 |
| T22 | F31 |
| T23 | F4 |
| T24 | F5 |
| T25 | F7 |
| T26 | F33 |
| T27 | F34 |
| T28 | F35 |
| T29 | F2 |
| T30 | F3 |

FIG. 4

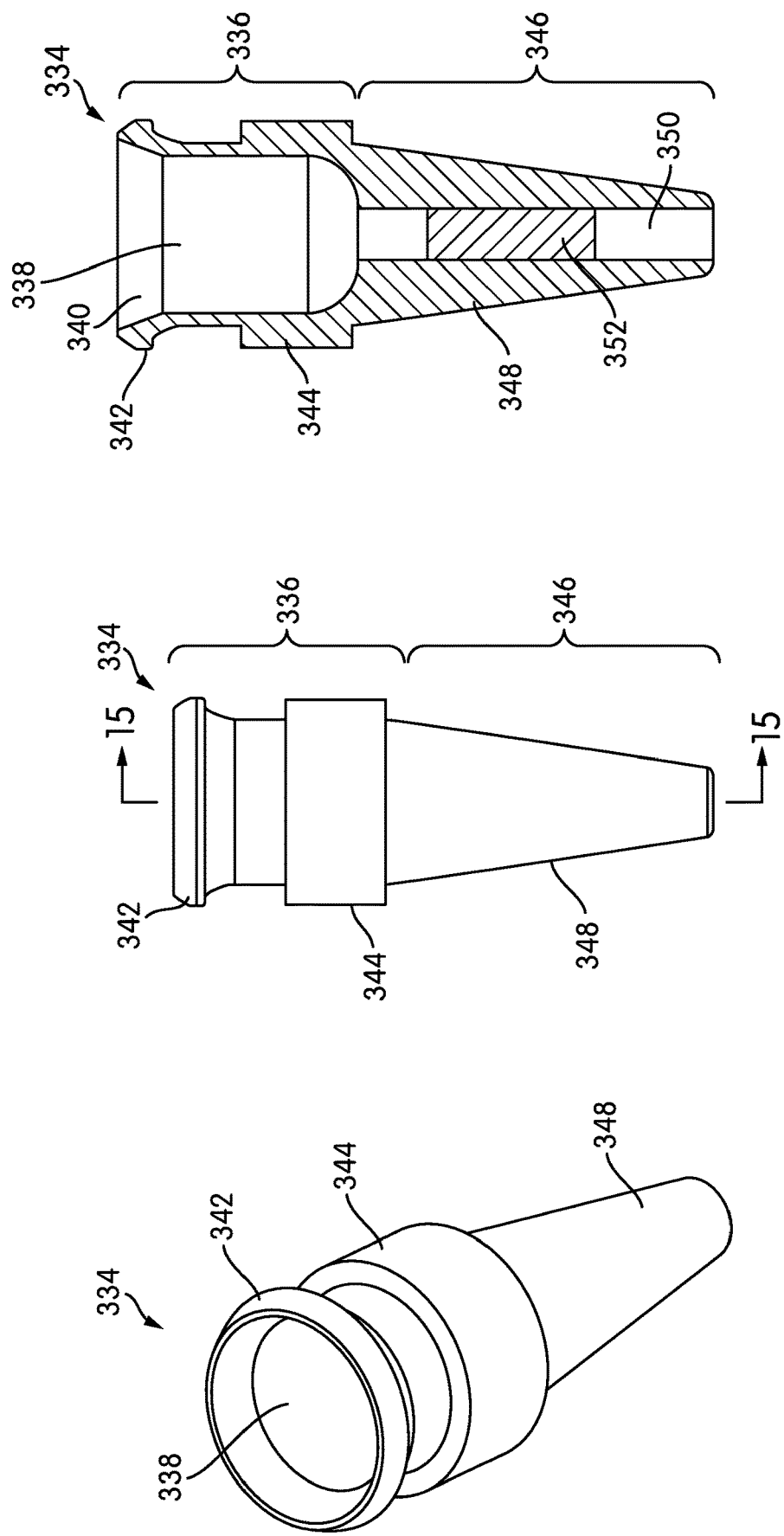

OPTICAL SIGNAL DETECTION MODULE

CROSS REFERENCE TO RELATED APPLICATIONS

This application claims the benefit of U.S. Provisional Application No. 62/173,045, filed Jun. 9, 2015, which is incorporated by reference herein.

FIELD OF THE DISCLOSURE

This disclosure relates to calibrating and monitoring optical measurement devices, such as fluorometers configured to excite and then detect and measure fluorescent emission signals.

BACKGROUND

None of the references described or referred to herein be admitted to be prior art.

Various industrial and commercial processes require the accurate measurement of optical electromagnetic emissions of differing wavelengths.

For example, in the field of nucleic acid diagnostics, to detect different nucleic acids of interest, different probes configured to hybridize to different nucleic acids, each of which may provide detectably different fluorescent emission signals, can be used. Different probes configured to hybridize to different targets can be formulated with fluorophores that fluoresce at a predetermined wavelength when exposed to excitation light of a prescribed excitation wavelength. Assays for detecting different target nucleic acids can be performed by alternately exposing sample material to different excitation wavelengths and detecting the level of fluorescence at the wavelength of interest corresponding to the probe for each target nucleic acid of interest. Parallel processing can be performed using different signal-detecting devices constructed and arranged to periodically measure signal emissions during the assay process, and with different signal-detecting devices being configured to generate excitation signals of different wavelengths and to measure emission signals of different wavelengths to thereby detect the different nucleic acid of interest. Because the probe hybridizes to the targeted sequence or its complement in a manner permitting detection of a signal indicating the presence of the targeted sequence in a sample, the strength of the fluorescent signal is proportional to the amount of target sequence or its complement that is present in the sample.

An optical measurement device ("OMD") configured to measure an optical emission signal (e.g., detect the presence or absence of and/or determine the intensity of) can include components for generating an excitation signal, components for directing the excitation signal at a target, components for receiving an optical emission signal from the target, and components for generating an electrical signal, such as a current and/or voltage, corresponding to the strength or intensity of the emission signal received. Such an OMD may comprise, for example, a fluorometer configured to direct an excitation signal of a prescribed wavelength at a target, and to generate an output signal, such as a current or voltage, based on receipt of a fluorescent emission signal of a prescribed wavelength from the target. Such an OMD may comprise a light-emitting element, such as a light-emitting diode (LED), a light-detecting element, such as a photo-diode, optic elements, such as one or more lens(es), filter(s), mirrors, optical collimators, optical wave guides (such as optic fibers), beam splitters, etc., and integrated circuits. The OMD may include a housing or other structure on which components of the OMD are supported. Such a housing may provide a window through which excitation light passes out of the housing and through which emission light passes into the housing, but the housing may otherwise provide a light-tight environment to minimize the influence of stray light on the emission signal detection. The optic elements may define optic paths from the light-emitting element to the window and from the window to the light-detecting element.

OMDs include, for example, fluorometers, such as any fluorometer embodiment described below. A diagnostic instrument may be configured to process numerous samples carried in multiple receptacles, and each fluorometer may be configured to take fluorometric readings from the receptacles as they are indexed past the fluorometer, or as the fluorometer is indexed past the receptacles, for example, once every 3 seconds. Thus, 1200 times for each hour of operation of the instrument, each fluorometer generates an excitation signal that is directed at the receptacle and measures the emission signal emitted by the contents of the receptacle, generating an electrical signal that is proportional to the intensity of the emission signal.

OMDs, such as fluorometers, can be susceptible to generating false, poor, and/or inconsistent readings for a number of reasons, including inherent differences between individual fluorometers due to the manufacturing process, malfunctioning of the OMD, and accumulation of debris in the system (primarily on or around the optic element). An OMD may include numerous components, and tolerances in the construction and installation of such components may exist from one OMD to the next. For example, system-to-system variability may be created by the stacked tolerances relating the construction and installation of light sources, optic fibers, lenses, filters, mirrors, etc. Such structural variability can lead to signal variability. Thus, the signals of the OMDs can be calibrated, i.e., standardized or normalized, to the signals of a "standard" OMD that detects an emission signal from a known emission source.

A malfunction (device failure and/or deteriorated performance) by an OMD during operation of the instrument or miscalibration of the OMD will cause errors in the optical readings generated by that OMD and thereby cause errors in the diagnostic results. Such malfunctions may be due to mechanical and/or electrical failures that occur during operation of the OMD. While operation of the OMDs can be checked during routine maintenance of the instrument, such opportunities for testing are rare, since the testing can only be performed when the instrument is shut down. In some instances, the instrument is operated continuously for extended periods of time for maximum throughput. Therefore, it becomes impractical and non-cost-effective to repeatedly shut the instrument down to perform OMD functionality testing.

Calibrating an OMD, such as a fluorometer, and/or monitoring the performance of the OMD typically involves generating an emission signal (a fluorescent reference emission) of known intensity and/or wavelength. The reference emission is detected by the OMD to be calibrated or monitored, and the reference signal generated by the OMD from the reference emission is compared to the signal to be expected from the reference emission. The "signal to be expected from the reference emission" or "expected reference signal" can represent a value for a measured optical parameter, such as wavelength, intensity, or combinations thereof, that a properly functioning and calibrated OMD would be expected generate when measuring an optical emission from an optical emission source having known and previously determined optical output characteristics.

For calibration, if the actual and expected reference signals are dissimilar, the OMD may be adjusted as necessary, e.g., by adjusting a parameter, e.g., electronic gains, in the signal processing electronics, so that the signal generated by the OMD matches the expected reference signal.

In the past, different mechanisms have been employed for generating reference emission signals for calibrating and/or monitoring fluorometers and other OMDs.

For example, a reference emission could be generated by a light source providing an optical signal of known intensity as well as, optionally, providing a referencing signal of a known wavelength. Such a light source may comprise a light emitting diode, a laser, or a white light and appropriate filters. Such devices may be difficult and expensive to build and maintain. In addition, the output of a light source may not be stable over time, so that a reference emission generated by the source may not be stable. Furthermore, such devices may be relatively large and bulky and may not be suitable for calibrating or testing the OMD in its normal operating environment, thereby requiring that the OMD be removed from an instrument or system in which it is employed so that it can be tested and re-calibrated.

Another mechanism for generating a reference emission is the use of controlled sources that generate known optical emission signals. Such sources may comprise fluorescent sources, such as liquid dyes. Such dyes can be placed into a receptacle, e.g., a multi-well plate, and placed into a diagnostic instrument for detection by the OMD, and the signal generated by the OMD can be compared to an expected reference signal from the fluorescent source. Such fluorescent sources can, however, be unstable and often have special storage requirements and pre-use preparation procedures. For example, liquid dyes may need to be stored in a frozen state and require special preparation procedures before their use. In addition, such sources may be unstable over time and may need to be used within a relatively short period of time following their preparation. Fluorescent dyes may also be susceptible to photo-bleaching, whereby repeated exposure of the fluorescent source to an excitation light signal may alter the emission signal over a period of time.

A third mechanism for generating a reference emission is to use emissive plastics, such as fluorescent plastics. Typical plastics used to date fluoresce at certain specific wavelengths (i.e., colors), and thus different plastics or differently-colored plastics are required for testing different fluorometers configured to detect emissions of different wavelengths. In addition, fluorescent plastics used today can be unstable and degrade over time and are susceptible to photo-bleaching. Thus, the reference emission signals generated by such plastics can be degraded over time and/or after repeated exposures to an excitation signal.

Accordingly, a need exists for means and methodologies for periodically confirming the proper functionality of the OMDs during the operation of the instrument as well as for calibrating or standardizing multiple OMDs so that they generate consistent readings.

SUMMARY

The following presents a simplified summary in order to provide a basic understanding of some aspects described herein. This summary is not an extensive overview of the claimed subject matter. It is intended to neither identify key or critical elements of the subject matter disclosed herein nor delineate the scope thereof. Its sole purpose is to present some concepts in a simplified form as a prelude to the more detailed description that is presented later.

In some embodiments, an optical signal detection module includes at least one optical measurement device (OMD) configured to detect an optical emission signal from an emission signal source placed in a signal-detecting position of the OMD. The optical signal detection module also includes a cover moveable between a closed position covering the signal-detecting position and an open position not covering the signal-detecting position. The cover includes an optical reference material that emits a reference emission detectable by the OMD. The cover is configured so that, when the cover is in the closed position, the inner surface is in the signal-detecting position of the OMD so that the OMD detects the reference emission. The optical signal detection module can also include a drive assembly coupled to the cover and configured to move the cover between the open position and the closed position. In some embodiments, the OMD can include a fluorometer.

In some embodiments, optical signal detection module includes two or more OMDs. Each OMD can be configured to detect emission of a different wavelength over a range of wavelengths. The optical reference material emits light over the range of wavelengths.

The optical signal detection module can also include a holding structure configured to hold the emission signal source in the signal-detecting position of the OMD. The cover can cover and limit access to the holding structure when the cover is in the closed position. The optical signal detection module can also include an optical fiber extending between the holding structure and the OMD. The emission signal source can include a receptacle containing a substance that emits an optical signal. And the holding structure can include a receptacle holding structure configured to hold the receptacle in the signal-detecting position of the OMD.

In some embodiments, the optical signal detection module can also include a robotic arm configured to move the receptacle into and out of the receptacle holding structure. The cover can have an inner surface includes the optical reference material.

In some embodiments, the optical reference material can be a fluorescent thermoplastic. The fluorescent thermoplastic can be a polyaryletherketone, and the polyaryletherketone can be polyether ether ketone in some embodiments. The fluorescent thermoplastic could also be a polysulfone. The fluorescent thermoplastic can have a repeatable light emission over a period of time and/or a spatially invariant light emission.

The optical signal detection module can also include a second cover moveable between a closed position and an open position. The second cover can move independently of the first cover. The optical signal detection module can also include a first OMD and a second OMD. In some embodiments, the first OMD is configured to detect emission of a different wavelength than the second OMD. The second cover, at the closed position, covers a signal-detecting position of the second OMD, and at the open position, does not cover the signal-detecting position of the second OMD. The second cover can include an inner surface that includes an optical reference material.

In some embodiments, the cover can include a lid pivotable about a hinge axis between the open position and the closed position.

In some embodiments, a reference device for calibrating or monitoring performance of an OMD includes a portion having an optical reference material configured to emit an emission detectable by the OMD. The reference device can be either a part of the robotic arm or configured to be removably coupled to the robotic arm. And the reference device can be configured to be placed in a signal-detecting position of the OMD by the robotic arm.

The optical reference material can be a fluorescent thermoplastic. The fluorescent thermoplastic can be a polyaryletherketone, and the polyaryletherketone can be polyether ether ketone in some embodiments. The fluorescent thermoplastic can also be a polysulfone. The fluorescent thermoplastic can have a repeatable light emission over a period of time and/or a spatially invariant light emission.

The reference device can be a reference receptacle that includes a portion having the optical reference material. The reference receptacle can be removably coupled to a distal end portion of the robotic arm. The reference receptacle can be attached to a cap that can be removably coupled to the robotic arm. In some embodiments, the reference receptacle can include a tapered lower portion and an upper portion that includes a recess configured to receive a portion of the cap. In some embodiments, the reference receptacle can include a lower portion defining a channel, and the optical reference material can be at least partially contained within the channel. The optical reference material can be a plug at least partially contained within the channel. The reference receptacle can also include a peripheral lip surrounding the recess and configured to be engaged by locking arms of the cap to secure the cap to the receptacle. The recess can include a tapered opening to facilitate insertion of the portion of the cap. The reference receptacle can be placed in a holding structure of an optical signal detection module that holds the reference receptacle in a signal-detecting position of an OMD of the optical signal detection module.

In some embodiments, the reference device can be a cap configured to be coupled to a distal end portion of a robotic arm.

In some embodiments, the portion having the optical reference material can compose at least a portion of the robotic arm such that the robotic arm is reference device. The portion having the optical reference material can be a tip extension extending from a distal end portion of the robotic arm. The tip extension can include a dowel inserted into a channel of the distal end portion of the robotic arm. In other embodiments, the portion having the optical reference material composes at least a distal end portion of a strip sleeve of the robotic arm. The strip sleeve can strip a pipette tip or a receptacle off a distal end portion of the robotic arm.

In some embodiments, the reference device can also include a pipette tip configured to be removably coupled to a robotic pipettor probe.

In some embodiments, a method for calibrating or monitoring performance of an OMD using an optical reference material that emits a reference emission includes moving, using a robotic arm, a first reference device includes an optical reference material into a signal-detecting position of the OMD. The method can also include detecting, using the OMD, an emission emitted by the optical reference material of the first reference device in the signal-detecting position. The method can also include generating a reference signal representing a characteristic of the emission detected by the OMD, and comparing the reference signal to an expected reference signal for the emission to calibrate or monitor the performance of the OMD. The OMD can include a fluorometer.

In some embodiments, the method further includes adjusting a signal processing gain of the OMD until the generated reference signal is within a predetermined threshold of the expected reference signal. In some embodiments, the method includes indicating failure or deteriorated performance of the optical measurement device when the generated reference signal is outside a predetermined threshold of the expected reference signal.

Moving the first reference device can include moving the robotic arm that can include the first reference device in some embodiments. In some embodiments, the robotic arm can include an automated pipettor. In some embodiments, the robotic pipettor can include a strip sleeve configured to strip a pipette tip off a probe of the robotic pipettor, and a distal end of the strip sleeve can include the optical reference material. In some embodiments, moving the first reference device into the signal-detecting position can include moving the strip sleeve axially with respect to the probe of the automated pipettor so that the distal end of the strip sleeve extends below of the probe. In some embodiments, the robotic arm can include a pick-and-place mechanism, and a portion of the pick-and-place mechanism can include the optical reference material. In some embodiments, moving the first reference device includes moving the robotic arm that is releasably coupled to the first reference device.

The method can also include moving, using the robotic arm, a second reference device that includes an optical reference material into the signal-detecting position of the OMD. The second reference device can have a geometric parameter different than a corresponding geometric parameter of the first reference device. The method can also include varying a position of the optical reference material of the first reference device relative to a focal point of the OMD before detecting the emission emitted by the optical reference material of the first reference device in the signal-detecting position.

The method can also include characterizing the optical reference material of the first reference device to determine the expected reference signal before comparing the reference signal to the expected reference signal for the emission to calibrate or monitor the performance of the OMD. Characterizing the optical reference material of the first reference device can include measuring a reference emission from the optical reference material of the first reference device with one or more OMDs. The method can also include associating a unique identification of the first reference device with the expected reference signal. The unique identification can be a serial number. The method can also include storing the expected reference signal in a data file, and the data file can be stored on a portable storage device.

In some embodiments, the optical reference material can be a fluorescent thermoplastic. The fluorescent thermoplastic can be a polyaryletherketone, such as polyether ether ketone in some embodiments. In other embodiments, the fluorescent thermoplastic can be a polysulfone. The fluorescent thermoplastic can have a repeatable light emission over a period of time and/or a spatially invariant light emission.

The method can also include providing a null reference material at the signal-detecting position of the OMD, and generating a signal representing a characteristic of the emission detected by the OMD while the null reference material is in the signal-detecting position. The method can further include determining if the OMD is operating properly from the generated signal by determining if the generated signal is a null signal.

In some embodiments, a method for calibrating or monitoring performance of an OMD includes providing a reference device at a receptacle holding structure of a diagnostic instrument such that an optical reference material on the reference device is positioned at a signal-detecting position of the optical measurement device. The method also includes detecting, using the OMD, an emission from an optical reference material of a first reference device located at a signal-detecting position of the OMD, and generating, using the OMD, a reference signal representing a characteristic of the emission detected by the OMD. The method further includes comparing the reference signal to an expected reference signal for the first reference device to calibrate or monitor performance of the OMD. The method can also include adjusting a signal processing variable of the OMD until the generated reference signal is within a predetermined threshold of the expected reference signal. The method can also indicating failure or deteriorated performance of the optical measurement device when the generated reference signal is outside a predetermined threshold of the expected reference signal. The OMD can include a fluorometer.

The first reference device can be formed in a shape of a receptacle configured to be held by a receptacle holding structure at the signal-detecting position. The reaction receptacle is a vial, a tube, a cuvette, a microtiter well, a cartridge, a beaker, or a chamber of a blister pack.

The optical reference material can include a fluorescent thermoplastic. In some embodiments, the fluorescent thermoplastic can be a polyaryletherketone, such as polyether ether ketone. In some embodiments, the fluorescent thermoplastic can be a polysulfone. The fluorescent thermoplastic can have a repeatable light emission over a period of time and/or a spatially invariant light emission.

The first reference device can include a channel and a reference plug formed from the optical reference material and at least partially disposed within the channel. The method can also include detecting, using the OMD, an emission from the reference plug of the reference device located in the signal-detecting position of the OMD.

The method can also include detecting, using the OMD, an emission from an optical reference material of a second reference device at the signal-detecting position of the OMD, the second reference device having a geometric parameter different than a corresponding geometric parameter of the first reference device.

The method can also include characterizing the optical reference material of the first reference device to determine the expected reference emission. The method can include associating a unique identification of the first reference device with the expected reference signal, and storing the expected reference signal in a data file. The data file can be stored on a portable storage device. Characterizing the optical reference material of the first reference device can include measuring a reference emission from the reference device with one or more distinct OMDs.

The method can also include varying a position of the first reference device relative to a focal point of the OMD before detecting, using the OMD, the emission from the optical reference material of the first reference device located at the signal-detecting position of the OMD.

In some embodiments, a method for calibrating an OMD includes detecting, using the OMD, an emission from an optical reference material located in a signal-detecting position of the OMD, and generating, using the OMD, a reference signal representing the emission detected by the OMD. The method also includes detecting, using the OMD, a background emission from a null reference material located in the signal-detecting position of the OMD, and generating, using the OMD, a background signal representing the background emission detected by the OMD. The method further includes subtracting the background signal from the reference signal, and comparing a difference of the reference signal and the background signal to an expected reference signal for the OMD to calibrate the OMD.

Comparing the reference signal to the expected reference signal to calibrate or monitor performance of the OMD can include adjusting a signal processing gain of the OMD until the generated reference signal is within a predetermined threshold of the expected reference signal.

The optical reference material can be a fluorescent thermoplastic. In some embodiments, the fluorescent thermoplastic is a polyaryletherketone, such as polyether ether ketone. In some embodiments, the fluorescent thermoplastic is a polysulfone. The fluorescent thermoplastic can have a repeatable light emission over a period of time and/or a spatially invariant light emission.

Other features and characteristics of the present disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various, non-limiting embodiments of the present disclosure. In the drawings, common reference numbers indicate identical or functionally similar elements.

FIG. 4 is a table showing mapping between the interface fiber positions and the baseplate fiber positions shown in FIGS. 2 and 3, according to an embodiment.

FIG. 13 is a perspective view of another optical reference standard receptacle, according to an embodiment.

FIG. 14 is a side view of another optical reference receptacle, according to an embodiment.

FIG. 15 is a cross-sectional view of another optical reference receptacle along the line 15-15 in FIG. 14, according to an embodiment.

DETAILED DESCRIPTION

Figure 1:
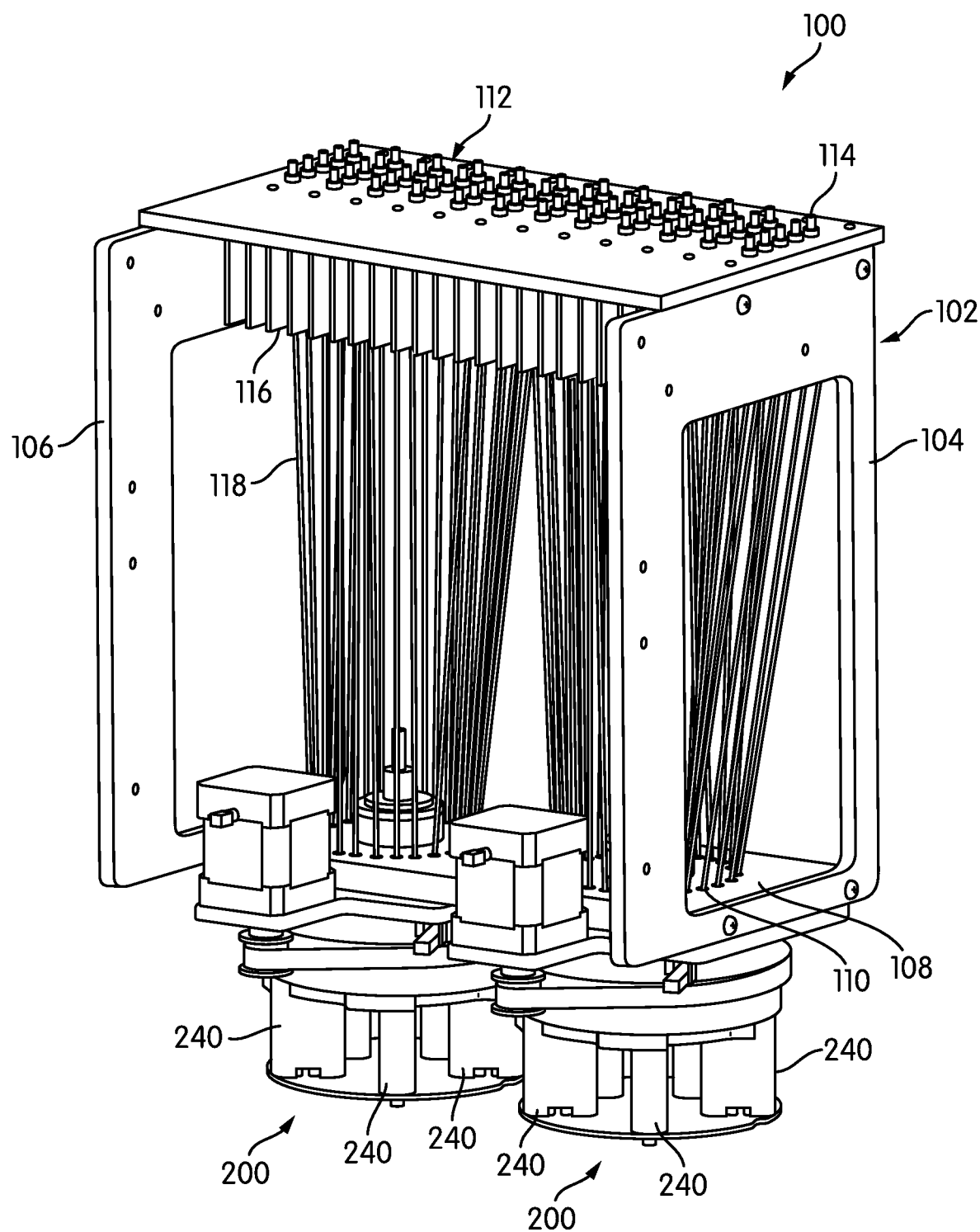
FIG. 1 is a perspective view of a signal detection module including a fiber reformatter frame, according to an embodiment.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated. References to "one embodiment," "an embodiment," "some embodiments," "an exemplary embodiment," "for example," "an example," "exemplary," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Unless defined otherwise, all terms of art, notations and other scientific terms or terminology used herein have the same meaning as is commonly understood by one of ordinary skill in the art to which this disclosure belongs. Many of the techniques and procedures described or referenced herein are well understood and commonly employed using conventional methodology by those skilled in the art. As appropriate, procedures involving the use of commercially available kits and reagents are generally carried out in accordance with manufacturer defined protocols and/or parameters unless otherwise noted. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

As used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, etc., are used for convenience in referring to such component, apparatus, location, feature, or a portion thereof in the drawings and are not intended to be limiting.

Aspects of the disclosure are embodied in methods, systems, and devices for calibrating (or standardizing) optical measurement devices ("OMDs"), such as fluorometers configured to detect and measure fluorescent signals, and/or for monitoring the performance of OMDs. In the context of the present disclosure, an OMD is a device configured to receive an optical emission signal, such as an emission in the visible range, such as luminescence or fluorescence, or the invisible range, such as gamma rays, X-rays, ultraviolet, and infrared, impinging on an optical signal receiving component of the OMD and to generate a signal, such as current and/or voltage, having measurable or otherwise determinable characteristics, such as a magnitude (amplitude) and/or other characteristics, such as phase, that is (are) dependent on the presence, absence, and/or intensity or other characteristics of the optical emission.

The calibration or monitoring includes measuring and/or detecting, using the OMD, an optical emission (referred to herein as a "reference emission") from a device or structure made from a material having at least one known optical emission property (referred to herein as a "reference device"), and comparing the reference signal of the OMD to an expected reference signal for a properly calibrated and properly functioning OMD exposed to the reference emission. In the context of this application, an "optical reference material" is a fluorescent material that emits light when exposed to excitation light. In some embodiments, the reference device is made, partially or fully, of the optical reference material.

In some embodiments, the optical reference material is strong, durable, heat-resistant and/or machinable, which allows the reference device to have nearly any physical configuration and be used in a variety of environments in which an OMD is likely to be employed. In some embodiments, the optical reference material provides a strong fluorescent reference emission when exposed to excitation light.

In some embodiments, the optical reference material can fluoresce across the entire spectrum of emission wavelengths anticipated to occur during normal operation of an instrument including one or more OMDs. For example, in some embodiments, the optical reference material can fluoresce across a spectrum of emission wavelengths that includes the predetermined wavelength(s) emitted by one or more probes configured to hybridize to different nucleic acids for which the instrument is configured to determine the presence of such nucleic acids in samples.

In some embodiments, a single reference device formed, at least partially, from a single fluorescent optical reference material, can be used to calibrate and/or monitor different OMDs configured to detect optical emissions at different specific wavelengths or ranges of wavelengths.

In some embodiments, the optical reference material has a repeatable (i.e., stable) light emission over an extended period of time during normal use of the reference device and OMD. In the context of this application, "repeatable" means that at least one characteristic (e.g., wavelength or intensity) of the emitted light remains constant or substantially constant for multiple emissions. The extended period of time can be, for example, the anticipated life of the OMD in some embodiments. In some embodiments, the extended period of time can be about five or more years, for example, about ten years. In some repeatable emission embodiments, the optical reference material can be highly resistant to photo-bleaching and/or other types of degradation that can occur over time. In some embodiments, the optical reference material has a repeatable light emission over an extended period of time even during heavy or frequent use of the reference device and OMD.

In some embodiments, the fluorescent optical reference material has a light emission that is spatially invariant. In the context of this application, "spatially invariant" means that at least one characteristic (e.g., wavelength or intensity) remains the same or substantially the same no matter the location at which the excitation light impinges on the optical reference material on the reference device. That is, different portions of the fluorescent optical reference material will each emit light having at least one characteristic (e.g., wavelength or intensity) that is constant or substantially constant, e.g., the same, among the different portions. In some embodiments, the fluorescent optical reference material continues to exhibit a repeatable emission and remains spatially invariant over an extended period of time during normal use of the reference device and OMD. In other embodiments, the fluorescent optical reference material continues to exhibit a repeatable emission and remains spatially invariant over an extended period of time even during heavy or frequent use of the reference device and OMD.

In some embodiments, the optical reference material can be a thermoplastic. For example, in some embodiments, the thermoplastic is a polyaryletherketone ("PAEK"), which is a family of semi-crystalline thermoplastics. In some embodiments, the PAEK is polyether ether ketone ("PEEK"). PEEK and similar semi-crystalline thermoplastics can be reliable and effective materials for construction of reference devices. Structurally, PEEK is strong, durable, heat-resistant, and machinable, and thus, a reference device constructed of PEEK can have nearly any physical configuration and can withstand most any environment in which an OMD is likely to be employed. Optically, PEEK can provide a strong fluorescent reference emission when exposed to excitation light and will fluoresce across the entire spectrum of anticipated wavelengths. Accordingly, in some embodiments, a single reference device formed, at least partially, from a single piece of PEEK, can be used to calibrate and/or monitor different OMDs configured to detect optical emissions at different specific wavelengths or ranges of wavelengths. The fluorescent properties of PEEK are repeatable (i.e., stable). For example, PEEK is highly resistant to photo-bleaching compared to other materials. Thus, a reference device made from PEEK can be expected to be usable for an extended period of time (e.g., about 10 or more years). PEEK is also spatially invariant and can provide constant or substantially constant fluorescent emission throughout its construction when formed as a reference device that can vary in size, shape or other dimensions.

In other thermoplastic embodiments, the optical reference material can be a thermoplastic from the polysulfone family of amorphous thermoplastics.

In other embodiments, the optical reference material can be any other suitable fluorescing material. In certain embodiments, the optical reference material is any suitable fluorescing material that is capable of providing a repeatable emission and/or is spatially invariant.

In some embodiments, when a new reference device is made from an optical reference material, the optical reference material is first "characterized" before the optical reference material is used for calibrating or monitoring OMDs. In the context of this application, "characterized" means that at least one characteristic (e.g., a current magnitude, a voltage magnitude, phase and/or other characteristic) of an expected OMD-generated signal, which is dependent on a characteristic of emitted light (e.g., wavelength or intensity), is measured or determined. Although the optical properties of a particular piece of the optical reference material, for example, PEEK, may be repeatable across the optical spectrum and spatially invariant, the optical properties of different pieces of the same optical reference material—for example, pieces from different lots of material or different manufacturers—may vary (e.g., by as much as 50%). The optical reference material can be characterized by placing the reference device comprising the optical reference material in the position in which the reference device is expected to be used during calibration and monitoring, and by measuring emission reference signals from the reference device with a "standard" (or "master") OMD known to be properly calibrated and operating properly. The resulting reference signal for that reference device is recorded, and that recorded reference signal can be compared with emission signals detected by other OMDs for calibrating the OMDs (i.e., standardizing them to the "standard" OMD) and/or for monitoring the performance of the OMDs. The recorded reference signal may be derived from multiple reference readings from one or more standard OMDs. For example, the recorded reference signal may be a numerical average of multiple signals. In addition, different expected reference signals may be recorded for different fluorescent wavelengths that are expected to be measured with the OMD. For example, fluorometer signals are often expressed in RFUs (relative fluorescent units) to define a relative magnitude of an emission signal. In some embodiments, the reference device emits a first RFU level at a first excitation wavelength, a second RFU level at a second excitation wavelength, a third RFU level at a third excitation wavelength, etc.

In some embodiments, the reference device may have a unique identification, for example, a part number, a serial number, or a machine-readable identifier (e.g., a barcode or RFID tag), and the reference device may be accompanied by data files. The data files can be stored, for example, on a portable storage device, such as a disc or thumb drive, or downloaded from a remote storage location. In some embodiments, the data files contain expected reference signals for the reference device. In some embodiments, the data files can be uploaded to a memory that is accessible to the instrument in which the OMD is located.

In some embodiments, the reference device is incorporated into a portion of the structure of the OMD or into a portion of the structure of a diagnostic instrument in which the OMD is incorporated. For example, in an embodiment described below, the reference device is incorporated into a cover configured to cover emission-receiving ends of optic fibers that can be coupled to a fluorometer configured to detect an emission signal transported by the fiber to the fluorometer. Alternatively, or in addition, the reference device can be configured as a component—or in the shape of a component—that is used in conjunction with the OMD. For example, in some embodiments in which the OMD is configured to detect an emission signal emitted by the contents of a receptacle (e.g., a vial) held in a receptacle holding structure, the reference device is completely or partially formed from the optical reference material (e.g., PEEK) in the shape of a receptacle (e.g., a vial) that can be operatively positioned in a signal-detecting position of optic fibers in the receptacle holding structure. In either embodiment (i.e., the reference device is incorporated into a structural portion of the OMD or the reference device is a component that is used in conjunction with the OMD), the OMD can be monitored and/or calibrated while operating the OMD in an essentially normal operating mode and without having to disassemble the OMD or a device in which the OMD is incorporated.

In some embodiments, a master reference device is made from the optical reference material, and characterized by a standard OMD to determine a reading that would be expected from other similar OMDs reading the master reference device. The output signal of each OMD using the master reference device is adjusted so that the OMD's output signal matches that of the standard OMD, thereby calibrating or standardizing all OMDs to the standard OMD. In various embodiments, the standard OMD is only used for characterizing a reference device. That is, the standard OMD may not be used in a production diagnostic instrument to measure assay results. In such embodiments, the standard OMD is minimally used and can be expected to experience limited wear that might otherwise affect the performance of the OMD.

Embodiments of an exemplary instrument in which an OMD is incorporated and for which a reference device made from the optical reference material may be used to calibrate and/or monitor the output signal of the OMD are described below.

Detection and, optionally, measurement of emission signals from emission signal sources, such as receptacles containing reaction materials undergoing a diagnostic procedure (e.g., a nucleic acid diagnostic assay) can be performed with a signal detection module, such as exemplary optical signal detection module 100 shown in FIG. 1. In some embodiments, optical signal detection module 100 is any one of the embodiments described in U.S. Patent Application Publication No. 2014/0263984, published Sep. 18, 2014, and entitled "Indexing Signal Detection Module." Optical signal detection module 100 may be incorporated into a diagnostic instrument (not shown). As used herein, a "diagnostic instrument" refers to any instrument capable of analyzing a sample and rendering a result. Any instrument capable of performing a hybridization assay, a molecular assay including a nucleic acid based amplification assay, a sequencing assay, an immunoassay, or chemistry assay on a sample is included in this definition of a diagnostic instrument. In some embodiments, an assay can be carried out directly on a sample without any sample processing, but other samples require processing before carrying out an assay. Samples requiring some form of sample processing before subjecting the samples to the steps of an assay include, in some embodiments, cell samples, tissue samples, stool samples, mucus samples, semen samples, cerebrospinal fluid samples, blood samples, bone marrow samples, serum samples, urine samples, bile samples, respiratory samples, sputum samples, and exosome samples, among others. Exemplary diagnostic instruments include the Tigris® and Panther® systems sold by Hologic, Inc., Bedford, Mass. In some embodiments, the diagnostic instrument is configured to process chemical or biological samples, such as by performing analytical or diagnostic assays or other processes. Such a diagnostic instrument may comprise, for example, an incubator, which includes a plurality of receptacle holders, each configured to hold one or more receptacles and constructed and arranged to impart thermal energy to the receptacles held thereby to change and/or maintain the temperature of the contents of each receptacle. An exemplary diagnostic instrument includes any one of the incubator embodiments disclosed in U.S. Patent Application Publication No. 2014/0038192, published Feb. 6, 2014, and entitled "System, Method, and Apparatus for Automated Incubation."

Optical signal detection module 100 can include a reformatter frame 102 in some embodiments. Reformatter frame 102 can include sides 104, 106, a base 108 within which are formed a plurality of fiber-positioning holes 110, and an interface plate 112 attached to an upper end of reformatter frame 102. Note that the designation of reformatter frame 102 as being upright or sides 104, 106 as being vertical is merely to provide a convenient reference with respect to the orientation of optical signal detection module 100 as shown in FIG. 1, and such terms of orientation are not intended to be limiting. Accordingly, the optical signal detection module 100 could be oriented at any angle, including vertical, horizontal, upside down, or any angle therebetween.

In some embodiments, optical waveguides, such as optical transmission fibers 118, extend between interface plate 112 and base 108 of reformatter frame 102. In the present context, an optical transmission fiber, or optical fiber, comprises a flexible, transparent rod made of glass (silica) or plastic that functions as a waveguide, or light pipe, to transmit light between the two ends of the fiber. Optical fibers can include a transparent core surrounded by an opaque or transparent cladding material having a lower index of refraction than the core material. A light transmission is maintained within the core by total internal reflection. Each optical fiber may comprise a single fiber having a single fiber core, or each fiber may comprise a fiber bundle of two or more fibers.

Reformatter frame 102 is constructed and arranged to reconfigure the relative spatial arrangements of fibers 118 from their first ends to their second ends so as to rearrange transmission fibers 118 into a spatial arrangement in which they can be more efficiently interrogated by an OMD to measure a signal transmitted therethrough. In the context of this description, the first end of fiber 118 corresponds to the end of fiber 118 closest to the emission signal source being measured, and the second end of fiber 118 corresponds to the end of fiber 118 closest to the OMD. This is merely a convenient convention for distinguishing one end of the transmission fiber 118 from another end of the transmission fiber 118. Otherwise, the designation of the ends of the fibers as being a first end or a second end is arbitrary.

The first ends of transmission fibers 118 are attached to an interface plate 112 in some embodiments. Fibers 118 can, for example, extend into or through openings formed through interface plate 112. Signal coupling devices 114, e.g., ferrules, may be provided in each of the openings formed in interface plate 112 for securely attaching each optical transmission fiber 118 to interface plate 112. Each signal coupling element can correspond to a location at which an emission signal source may be placed in a signal-detecting position of the associated optical transmission fiber 118 and thus in a signal detecting position of the OMD positioned to detect an optical signal transmitted through the optical transmission fiber 118. Although not shown in FIG. 1, each opening formed in interface plate 112 may be in signal transmission communication with an emission signal source. In one embodiment, an emission signal source may comprise a receptacle (e.g., a vial) containing the contents of a chemical or biological assay. In the case of optical emission signals, the receptacles may be positioned and held so as to optically isolate each receptacle from the surrounding receptacles. In addition, the receptacles may be held within an incubator device located in optical communication with interface plate 112 and configured to alter the temperature of receptacles or maintain the receptacles at a specified temperature. In some embodiments, interface plate 112 is formed of a suitably heat-conducting material, such as aluminum or copper, and interface plate 112 can further include heat dissipating fins 116 formed on one side of interface plate 112. Heat dissipating fins 116 are configured to dissipate heat from interface plate 112. A fan (not shown) may be provided to enhance heat dissipation via the fins 116 in some embodiments. Also, coupling elements (e.g., ferrules) 114 may be thermally insulating to insulate transmission fibers 118 from the heat of the receptacles held within the incubator. Suitable insulating materials include Delrin®, black PVC, or black Valox®.

In the embodiment illustrated in FIG. 1, transmission fibers 118 are attached to interface plate 112 in a rectangular configuration comprising a plurality of rows, each row having one or more transmission fibers 118. As shown in the illustrated embodiment, transmission fibers 118 may extend between adjacent fins 116 into an associated opening formed in interface plate 112. The illustrated embodiment includes twelve rows of five transmission fibers 118 each, for a total of sixty transmission fibers that can be employed for interrogating up to sixty individual emission sources, such as receptacles containing reaction materials therein. There can be other configurations of transmission fibers 118. For example, there can be more or less than twelve rows of transmission fibers, or there can be more or less than sixty transmission fibers 118.

In some embodiments, receptacles may comprise any container configured to hold a liquid and include, without limitation, vials, tubes, cuvettes, microtiter wells, cartridges, beakers, chambers of blister packs, etc. In some embodiments, each receptacle may be one of a plurality of connected receptacles, one of a plurality of integrally formed receptacles, or one of a plurality of separate receptacles.

The second ends of transmission fibers 118 can be connected to base 108 of reformatter frame 102, for example, by being aligned with or inserted into or through fiber-positioning holes 110. Fiber-positioning holes 110 may be in a spatial arrangement that is different from the spatial arrangement of the fiber-receiving holes formed in interface plate 112 and are in a position that can be more efficiently interrogated by one or more OMDs. In the illustrated embodiment, fiber-positioning holes 110 are arranged in two circles. Other spatial arrangements are contemplated, including, two or more concentric circles, one or more open rectangles, one or more ovals, etc.

In the illustrated embodiment, two signal detector heads 200 are attached to a lower end of reformatter frame 102. Each of signal detector heads 200 holds one or more OMDs 240 and are configured to move OMDs 240 with respect to reformatter frame 102 and to sequentially place each OMD 240 into an operative, signal-detecting position of each of the second ends of transmission fibers 118. In the context of the present disclosure, an operative, signal detecting position refers to a relative spatial position and/or orientation between an object (e.g., an emission signal source such as a receptacle containing a sample), and an OMD 240 at which an optical signal emitted by the object will impinge upon a signal receiving component of OMD 240, and OMD 240 will generate a signal having at least one measurable and/or determinable characteristic that is determined by at least one characteristic of the optical signal, such as intensity, wavelength, frequency, etc. A specific operative, signal detecting position between an emission signal source and OMD 240 may depend on a number of factors, including, but not limited to, the strength (intensity) of an excitation signal, if applicable, generated by OMD 240, the strength (intensity) of the optical emission from the emission signal source, focusing power and efficiency of optical components of the OMD, light gathering and transmitting characteristics (efficiency) of optical components of the OMD, efficiency of optoelectric signal generating elements, such as photodiodes or photomultiplier tubes of the OMD, the focal properties of the optic elements of the OMD (e.g., focal length), and ambient conditions, such as ambient light conditions.

Figure 2:
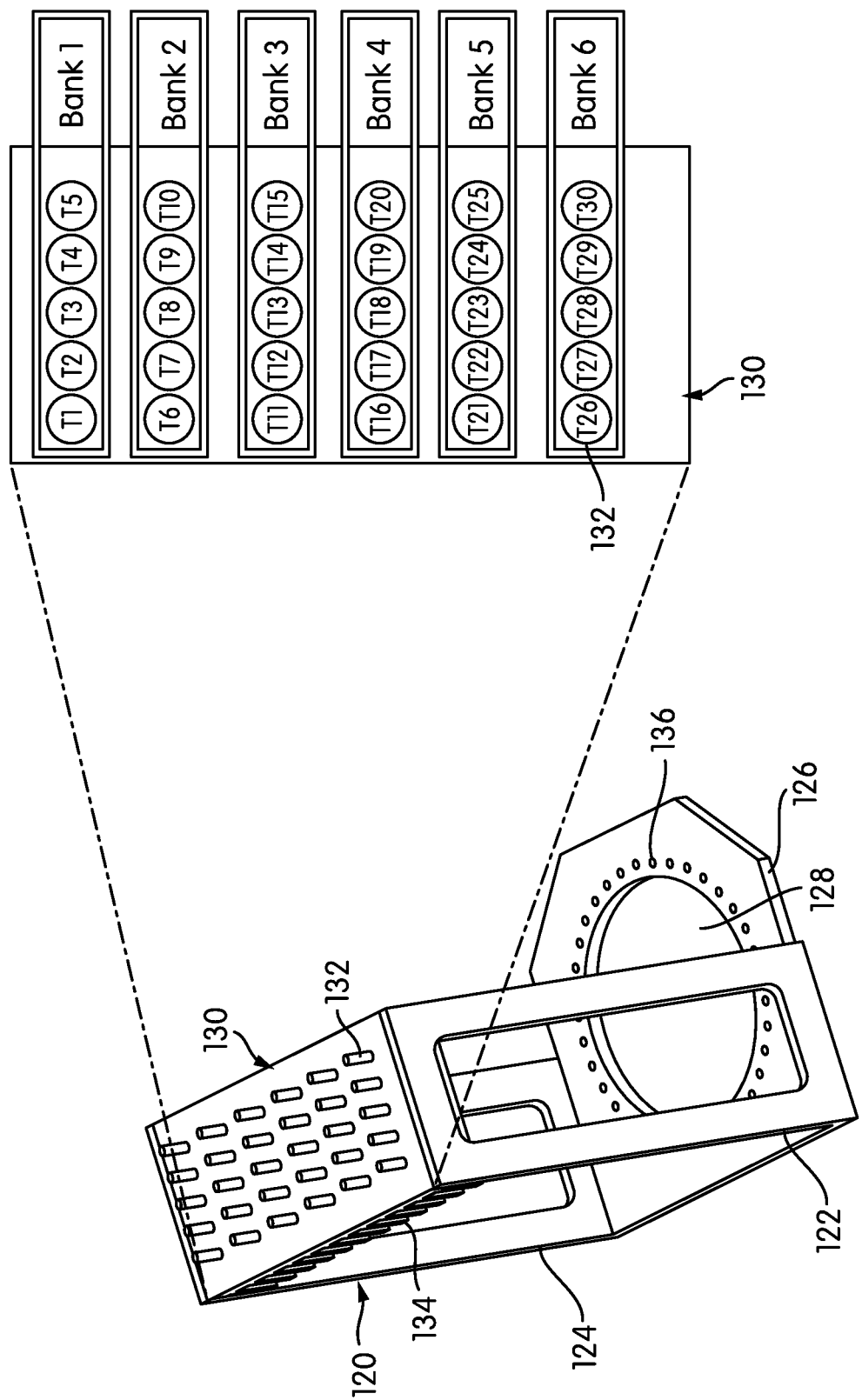
FIG. 2 is a perspective view of an exemplary fiber reformatter frame showing a fiber position mapping in an interface plate of the frame, according to an embodiment.
Figure 3:
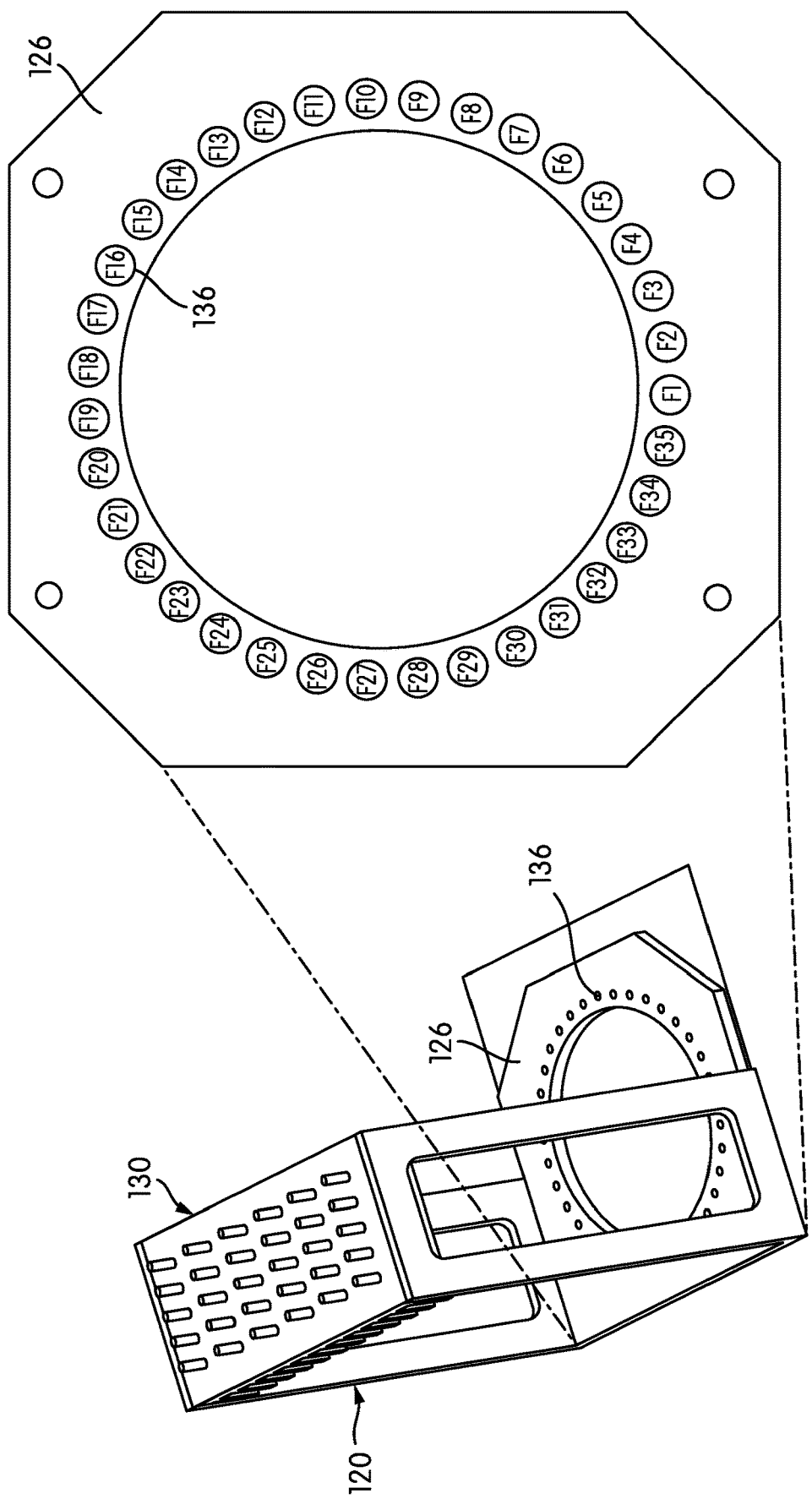
FIG. 3 is a perspective view of the fiber reformatter frame showing a fiber position mapping in a baseplate of the frame, according to an embodiment.

FIGS. 2 and 3 are perspective views of an alternative embodiment of a reformatter frame 120—shown without transmission fibers installed thereon. In some embodiments, reformatter frame 120 includes sides 122, 124 and a base 126 having an opening 128 formed therein with a plurality of fiber-positioning holes 136 positioned around the opening 128 in a generally circular configuration. An interface plate 130 is attached to the sides 122, 124 of the frame 120 at an end thereof opposite base 126. Interface plate 130 includes a plurality of signal coupling elements 132, e.g., ferrules, and may include heat dissipating fins 134 disposed on a side of interface plate 130 opposite coupling elements 132. Each coupling element 132 can correspond to a fiber-receiving opening formed through interface plate 130. As shown in FIGS. 2 and 3, coupling elements 132 are arranged in a rectangular configuration of six rows of five coupling elements each. In some embodiments, the number of openings 136 formed in the base 126 corresponds to the number of coupling elements 132 formed in interface plate 130. FIG. 2 also shows an exemplary mapping of the spatial arrangement of fiber positions in interface plate 130 of the reformatter frame 120. As shown in FIG. 2, interface plate 130 includes six rows, or banks, of five fiber positions each, designated T1-T5, T6-T10, T11-T15, T16-T20, T21-T25, and T26-T30, for a total of thirty fiber positions. In other embodiments, interface place 130 includes more or less than six rows of fiber positions, or more or less than thirty fiber positions.

FIG. 3 shows a mapping of the spatial arrangement of fiber positions of the fiber-positioning holes 136 formed in base 126 of reformatter frame 120. In the illustrated embodiment, 35 fiber-positioning holes 136 are formed in the base 126, and are designated F1, F2, F3, F4, . . . F35, starting at the lower (six o'clock) position of the opening 128. In other embodiments, more or less than 35 fiber-positioning holes 136 are formed in the base 126.

FIG. 4 is a table showing an exemplary mapping of (1) the rectangularly-arranged interface positions T1-T30 in interface plate 130 to (2) thirty of the circularly-arranged fiber-positioning hole positions F1-F35 in the base 126. Note that the fiber positions are not mapped T1-F1, T2-F2, T3-F3, T4-F4, etc.

The mapping shown in FIG. 4 is exemplary only; other mappings between the fiber positions in interface plate 130 and the fiber positions in base 126 may be used. In some embodiments, when running fibers 118 from base 108 to interface plate 112, bending of fibers 118 is minimized and excessive bending is avoided, and any mapping that addresses this goal may be suitable. In some embodiments, the number of interface positions in interface plate 130 is exceeded by the number of fiber-positioning holes in the base 126 (e.g., 30 interface positions in interface plate 130 vs. 35 fiber-positioning holes in the base 126). Fluorescent calibration targets can be placed in the additional fiber-positioning holes in the base to test and/or calibrate the signal detectors of signal detector head 200.

In another embodiment, the number of interface positions in interface plate 130 is equal to the number of fiber-positioning holes in the base 126 (e.g., 30 in each).

Figure 5:
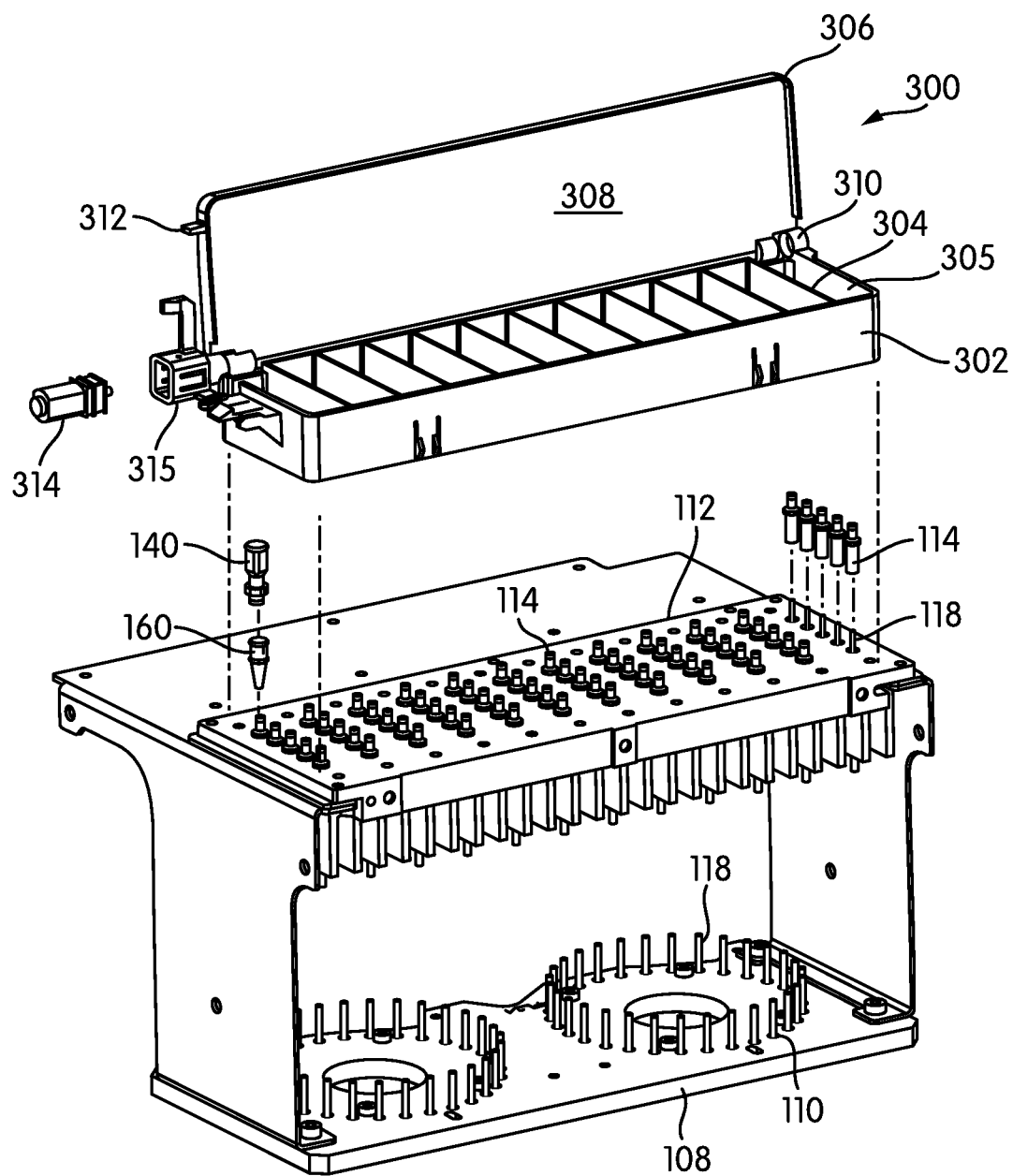
FIG. 5 is an exploded perspective view of a fiber reformatter frame and a cover assembly, with the cover in an open position, according to an embodiment.

FIG. 5 is an exploded view of a reformatter frame 120. As shown, the optical signal detection module 100 may include a cover assembly 300 supported on interface plate 112 of reformatter frame 120 in some embodiments. As explained above, reformatter frame 120 can include a plurality of optical fibers 118 extending through fiber positioning holes 110 in base 108 of frame 120 up and through corresponding holes formed in interface plate 112 where fibers 118 may be connected to signal coupling elements 114, such as ferrules. For illustrative purposes, FIG. 5 shows only upper and lower portions of optical fibers 118.

Figure 6:
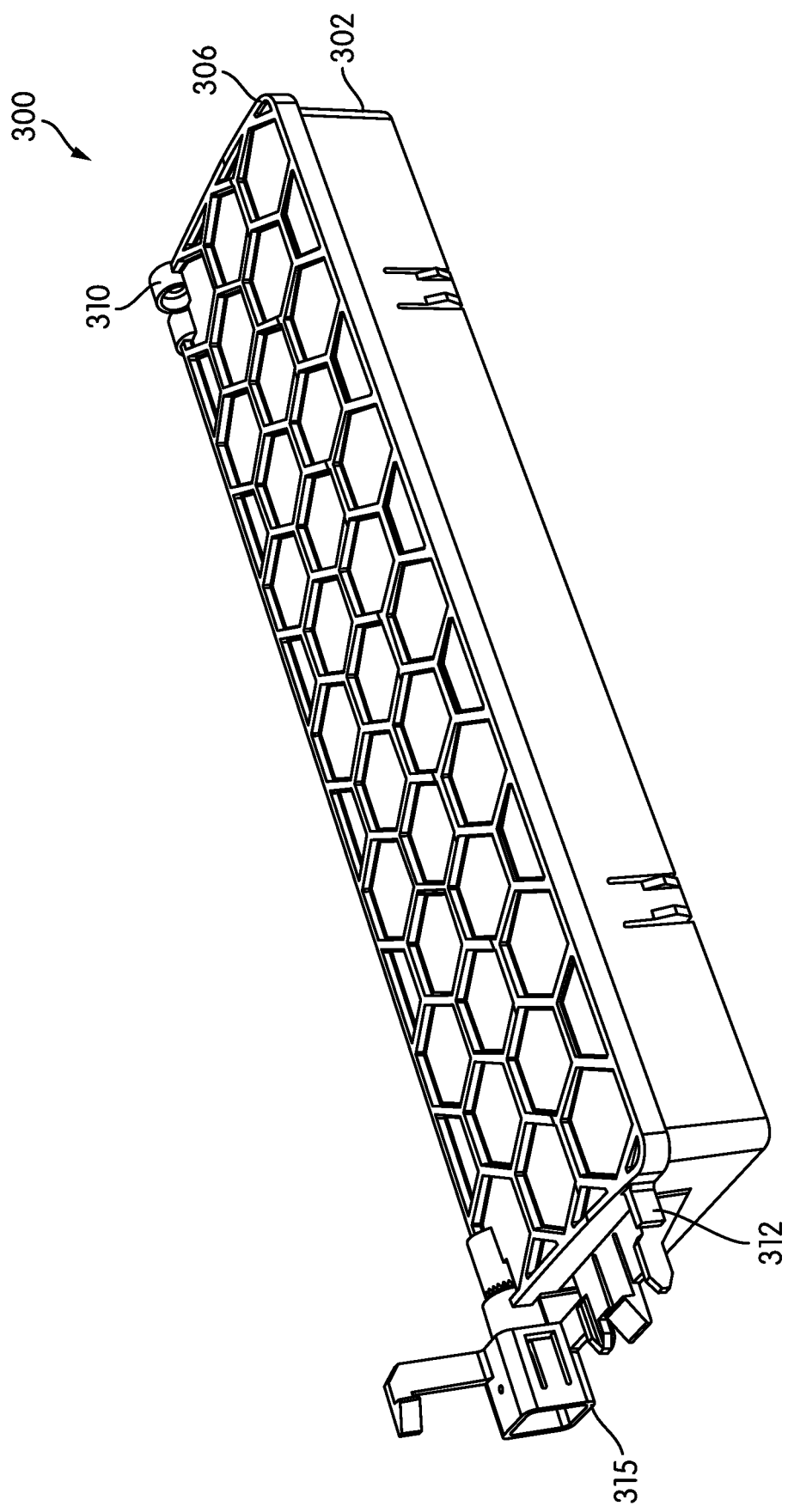
FIG. 6 is a perspective view of the cover assembly, with the cover in a closed position, according to an embodiment.

As shown in FIGS. 5 and 6, cover assembly 300 can include a frame 302 that is supported on interface plate 112. Frame 302 includes a plurality of separator walls 304 extending between opposing sides of frame 302, thereby defining discrete compartments 305 between adjacent walls. Each compartment 305 can contain one row of signal coupling devices 114.

The cover assembly 300 can also include a cover 306 mounted with respect to frame 302 so as to be moveable between an open position as shown in FIG. 5 permitting access to signal coupling devices 114, and a closed position resting on top of frame 302, as shown in FIG. 6, thereby covering each compartment 305 and the rows of signal coupling devices 114 contained therein. Thus, cover 306 is configured to be selectively moved between a closed position covering and preventing or limiting access (i.e., physical access and/or access by ambient light (infiltration)) to signal-detecting positions with respect to OMD(s) 240 and an open position permitting access to the signal-detecting positions. For example, cover 306 of the cover assembly 300 may be moved to the opened position to permit one or more emission signal sources (e.g., a receptacle containing a sample or a reference device) to be placed into one or more signal-detecting positions with respect to one or more OMDs 240 or into one or more positions that can be moved into signal-detecting positions by relative movement between the OMD(s) 240 and the emission signal source(s). And after the emission signal sources are placed, cover 306 can be moved into the closed position to prevent ambient light from interfering with the detection and/or measurement of optical signals from the emission signal sources.

In the illustrated embodiment, cover 306 is a pivoting lid that is moveable about a hinge axis 310 between the open position and the closed position.

In some embodiments, the cover assembly 300 includes a drive assembly coupled to cover 306 configured to effect powered movement of cover 306 between the open and closed positions. For example, the drive assembly can include a micromotor 314 may be provided within a motor casing 315 for effecting powered, hinge-wise movement of cover 306 between the open and closed positions. In various embodiments, a sensor may be provided for automated detection of a position of cover 306 with respect to frame 302. For example, an indicator tab 312 extending from a portion of cover 306 may cooperate with one or more detection devices, such as slotted optical sensors (not shown), for detecting a position of cover 306. Alternatively, or in addition, a position of cover 306 can be monitored by encoder counts of a motor for effecting powered movement of cover 306.

In some embodiments, not shown, instead one cover 306 as shown in FIG. 5, cover assembly 300 includes a plurality of covers 306 that collectively cover each compartment 305 and the rows of signal coupling devices 114 contained therein. The plurality of covers 306 can move independently from each other in some embodiments so that each can be independently moved between the open and closed positions.

As will be explained below, optical fibers 118 can be configured to transmit an optical signal between an OMD 240 positioned at a first end of the optical fiber 118, below base 108, and a second end at signal coupling device 114 so as to detect an optical signal from an emission signal source positioned above the signal coupling device 114. In one embodiment, the emission signal source may comprise a receptacle 160 positioned above each of one or more of fibers 118 (above the corresponding signal coupling device 114). Receptacle 160 may contain a chemical or biological substance that fluoresces under certain conditions and when exposed to an optical excitation signal. In an embodiment, the receptacle 160 is made from a material that is sufficiently optically transmissive so that fluorescence or other optical emission from the substance contained in receptacle 160 can be detected by an OMD. Suitable materials composing receptacle 160 include, for example, polypropylene, cyclic olefin copolymer (COC), acrylate polymer (acrylic), polycarbonate, glass, quartz and other materials known to those skilled in the art. Receptacle 160 may be closed by a cap 140 that is configured to provide a snap connection between cap 140 and the receptacle 160 and, in some embodiments, is further configured to be manipulated (e.g., picked up and moved) by a robotic arm. As used in this application, a "robotic arm" refers to an electromechanical device that translates a payload (e.g., an automated pipettor, a receptacle transport mechanism (such as a pick-and-place mechanism), a camera, a sensor, a capper/decapper, etc.) in the X, Y, and/or Z directions. Receptacle holding structures (not shown) may be provided above the rows of signal coupling devices 114. Such holding structures may be configured to hold each receptacle 160 in a signal-detecting position of a corresponding fiber 118 and signal coupling device 114 and to optically isolate each receptacle 160 from adjacent receptacles. Further details of exemplary receptacle holding structures are provided in U.S. Patent Application Publication No. 2014/0038192.

The size of receptacle 160 and cap 140 when coupled is such that the assembled receptacle 160 and cap 140 will fit within compartment 305 of cover assembly 300 so that cover 306 can be closed over the assembled receptacle 160 and cap 140 operatively positioned above a respective signal coupling device 114.

Figure 7:
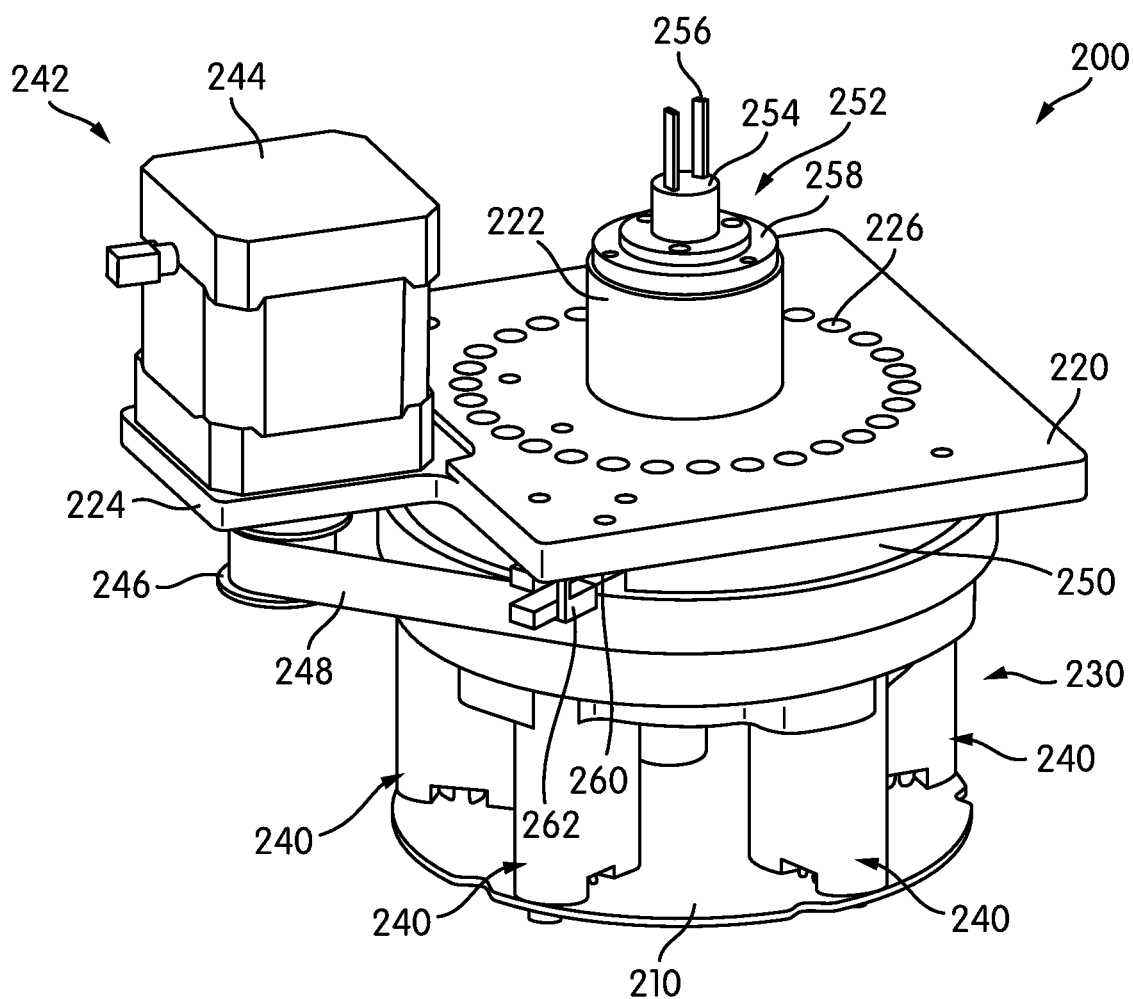
FIG. 7 is a perspective view of a signal detector head of a signal detection module, according to an embodiment.

An exemplary signal detector head 200 is shown in FIG. 7. Signal detector head 200 may be attached to a reformatter frame 102/120 and can be constructed and arranged to index one or more OMDs 240 into operative positions with respect to each transmission fiber disposed in a fiber-positioning hole of the base of the reformatter frame. In the present context, an OMD is in an "operative position" with respect to a transmission fiber, or other source of optical emission, if the OMD is spatially positioned (located and oriented) to direct an excitation signal at an input portion of fiber 118 (e.g., a proximal end) or directly at the emission signal source so that sufficient excitation energy will reach the emission signal source—directly or via the fiber—and to receive a detectable amount of an emission signal from a portion of the fiber (e.g., the proximal end) or directly from the emission signal source.

Although signal detector head 200 is configured to be coupled to any reformatter frame, including reformatter frames 102/120 described herein, for simplicity of the description, signal detector head 200 will be described in the context of its implementation on reformatter frame 102 shown in FIG. 1.

In the embodiment shown in FIG. 7, signal detector head 200 can include a base plate 220 configured to be attached to base 108 of reformatter frame 102, and signal detector head 200 can include a plurality of fiber tunnels 226 arranged in a configuration corresponding to the spatial arrangement of fiber-positioning holes 110 formed in base 108 of reformatter frame 102 so that each fiber tunnel 226 will align with a corresponding one of the fiber-positioning holes 110.

In general, the signal detector head is configured to move one or more OMDs 240 to sequentially place each OMD 240 into an operative position of each transmission fiber 118 to detect a signal transmitted by the transmission fiber. Signal detector head 200 further includes a detector carrier 230, which, in the illustrated embodiment, comprises a carousel that carries a plurality of OMDs 240 in a circular pattern. In the illustrated embodiment, signal detector head 200 includes six individual OMDs 240, each mounted on a printed circuit board 210 and each configured to excite and detect a different emission signal or an emission signal having different characteristics, such as fluorescent emissions of different wavelengths.

Detector carrier 230 can also be configured to be rotatable with respect to base plate 220. A detector drive system 242 constructed and arranged to effect powered movement, e.g., rotation, of detector carrier 230 includes a drive motor 244 supported on a motor mount portion 224 of base plate 220. A drive belt 248 is disposed on an output shaft wheel 246 of motor 244 and around a pulley wheel 250 that is attached to or part of detector carrier 230. Rotation of output shaft wheel 246 of motor 244 causes a corresponding rotation of the pulley wheel 250 and detector carrier 230 via the belt 248.

In some embodiments, motor 244 is a stepper motor and can include a rotary encoder. Detector carrier 230 may include one or more positional or status feedback sensors. For example, detector carrier 230 can include a home flag 260 that is detected by an optical detector 262 for indicating a rotational "home" position of detector carrier 230. Optical sensor 262 may comprise a slotted optical sensor comprising an optical transmitter and receiver in which the path between the transmitter and receiver is broken by the passage of home flag 260. Other sensors for indicating a home position may also be used. Such sensors may comprise proximity sensors, magnetic sensors, capacitive sensors, etc.

A rotary connector transmits data and/or power signals between rotating detector carrier 230 and OMDs 240 carried thereon, and a non-rotating reference environment, such as an external controller and power source.

Further details of signal detector head 200 as well as alternative signal detector head configurations are described in U.S. Patent Application Publication No. 2014-0263984.

Figure 19:
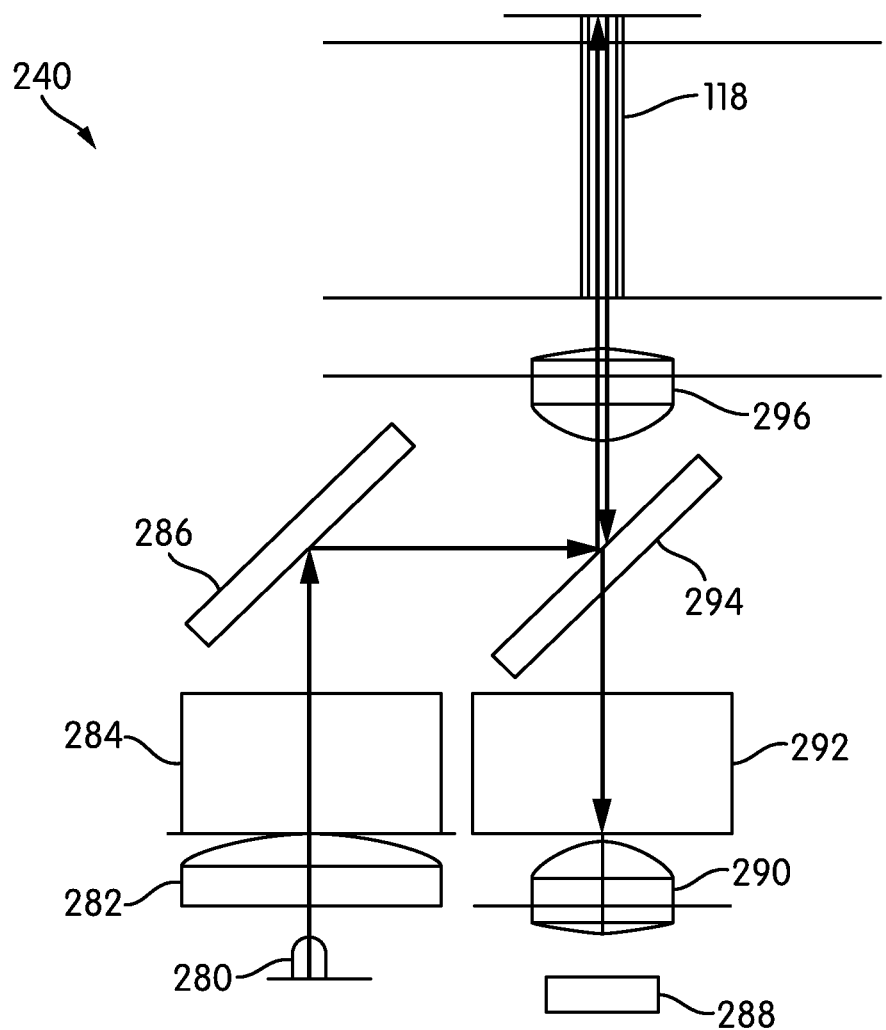
FIG. 19 is a schematic view of an embodiment of an exemplary optical path within an optical measurement device, according to an embodiment.

Operation of OMD 240 in an exemplary embodiment is illustrated schematically in FIG. 19. OMD 240 can be a fluorometer, as shown, that is constructed and arranged to generate an excitation signal of a particular, predetermined wavelength that is directed at a potential source of fluorescent emission. As the contents of a receptacle undergoing a diagnostic procedure to determine if a probe or marker having a corresponding emission signal of a known wavelength is present. When signal detector head 200 includes multiple fluorometers—e.g., six—each fluorometer may be configured to excite and detect an emission signal having a different wavelength to detect a different label associated with a different probe hybridized to a different target analyte.

An excitation signal is emitted by an excitation source 280, such as an LED, which may generate light at a predetermined wavelength, e.g., red, green, or blue light. Light from source 280 passes through and is focused by an excitation lens 282 and then passes through an excitation filter 284. FIG. 19 is a schematic representation of OMD 240, and the focusing functionality provided by excitation lens 282 may be effected by one or more separate lenses disposed before and/or after filter element 284. Similarly, the filter functionality provided by filter element 284 may be effected by one or more individual filters disposed before and/or after the one or more lenses that provide the focusing functionality. Filter element 284 may comprise a low band pass filter and a high band pass filter so as to transmit a narrow wavelength band of light therethrough. Light passing through excitation lens 282 and excitation filter element 284 is reflected laterally by mirror 286 toward a dichroic beam splitter 294. Dichroic beam splitter 294 is constructed and arranged to reflect substantially all of the light that is within the desired excitation wavelength range toward the objective lens 296 while allowing light that is not in the wavelength range to pass through the beam splitter. From the objective lens 296, excitation light passes into a transmission fiber 118 and toward an emission source at the opposite end thereof so as to expose the source to the excitation signal.

At least a portion of any emission that is excited by the excitation signal enters the transmission fiber 118 and passes back through objective lens 296, from which the emission light is focused toward dichroic beam splitter 294. Dichroic beam splitter 294 is configured to transmit light of a particular target emission wavelength range toward emission filter 292 and emission lens 290 and to reflect light that is not within the target emission wavelength range. Again, the filtering functionality provided by emission filter 292 may be effected by one or more filter elements and may comprise a high band pass and low band pass filter that together transmit a specified range of emission wavelength that encompasses a target emission wavelength. The emission light is focused by emission lens 290, which may comprise one or more lenses disposed before and/or after the filter element(s) represented by emission filter 292. Emission lens 290 thereafter focuses the emission light of the target wavelength at the detector 288, which may comprise a photodiode and which generates a voltage signal corresponding to the intensity of the emission light at the prescribed target wavelength that impinges the detector.

As detector carrier 230 rotates, each of the OMDs 240 is sequentially placed in an operative position of a second end of a different transmission fiber 118 to interrogate (i.e., measure a signal from) an emission signal source located near a first end of the transmission fiber 118. Detector carrier 230 pauses momentarily at each transmission fiber 118 to permit OMD 240 to detect an emission signal transmitted through the transmission fiber 118. In embodiments in which OMD 240 is a fluorometer, detector carrier 230 pauses momentarily to permit the signal detector to generate an excitation signal of a specified wavelength that is transmitted by the transmission fiber 118 to the emission signal source (e.g., a receptacle) and to detect fluorescence of a specified wavelength excited by the excitation signal that is emitted by the contents of the receptacle and transmitted by the transmission fiber 118 to the fluorometer. Thus, in an embodiment, each transmission fiber 118 can be employed to transmit both an excitation signal and the corresponding emission signal, and each OMD 240 can be used to scan multiple transmission fibers 118 and associated emission signal sources.

In some embodiments, the emission signal source associated with each transmission fiber 118 is interrogated once by each OMD 240 per revolution of detector carrier 230. In embodiments in which signal detector head 200 includes multiple OMDs 240 configured to detect different signals (e.g., emission signals of different wavelengths), each emission signal source can be interrogated once for each different signal for every revolution of detector carrier 230. Thus, in the case of a nucleic acid diagnostic assay, the contents of each receptacle can be interrogated for each target analyte corresponding to the different probes employed (as indicated by different colored labels) once per revolution of detector carrier 230.

Figure 8:
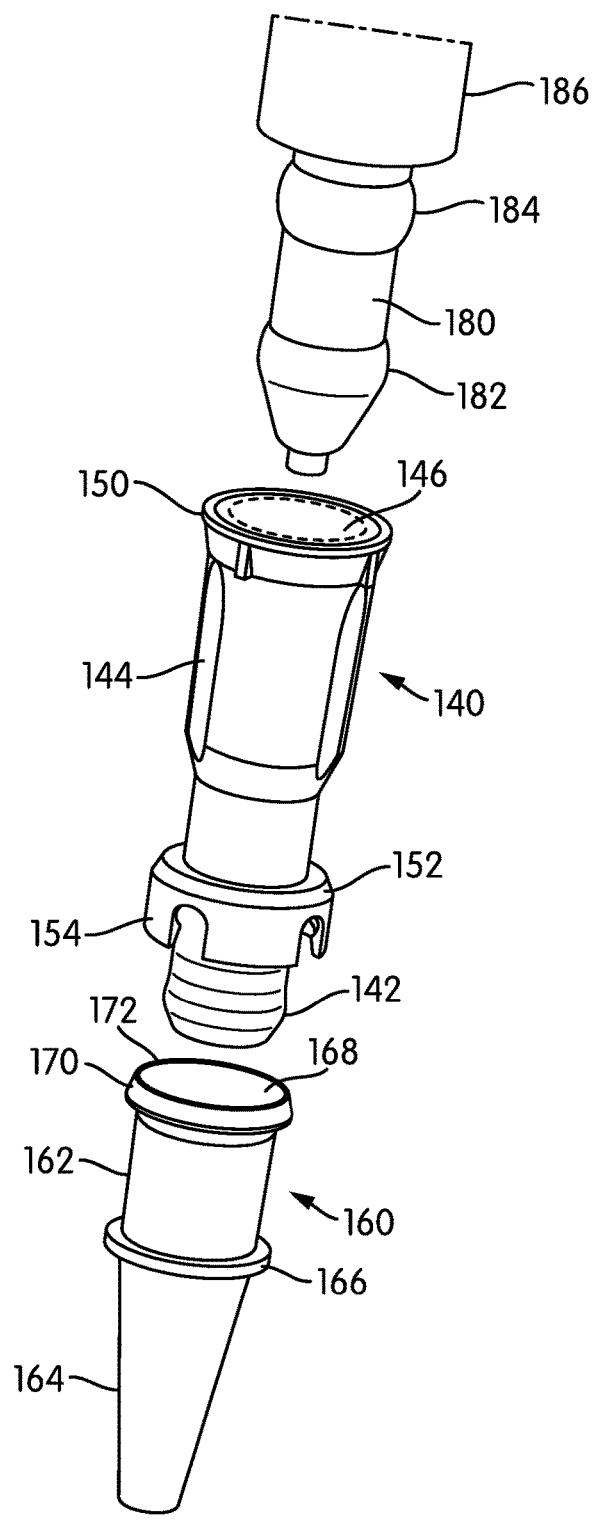
FIG. 8 is an exploded perspective view of a receptacle, a cap, and a portion of a robotic arm configured to be inserted into the cap, according to an embodiment.
Figure 9:
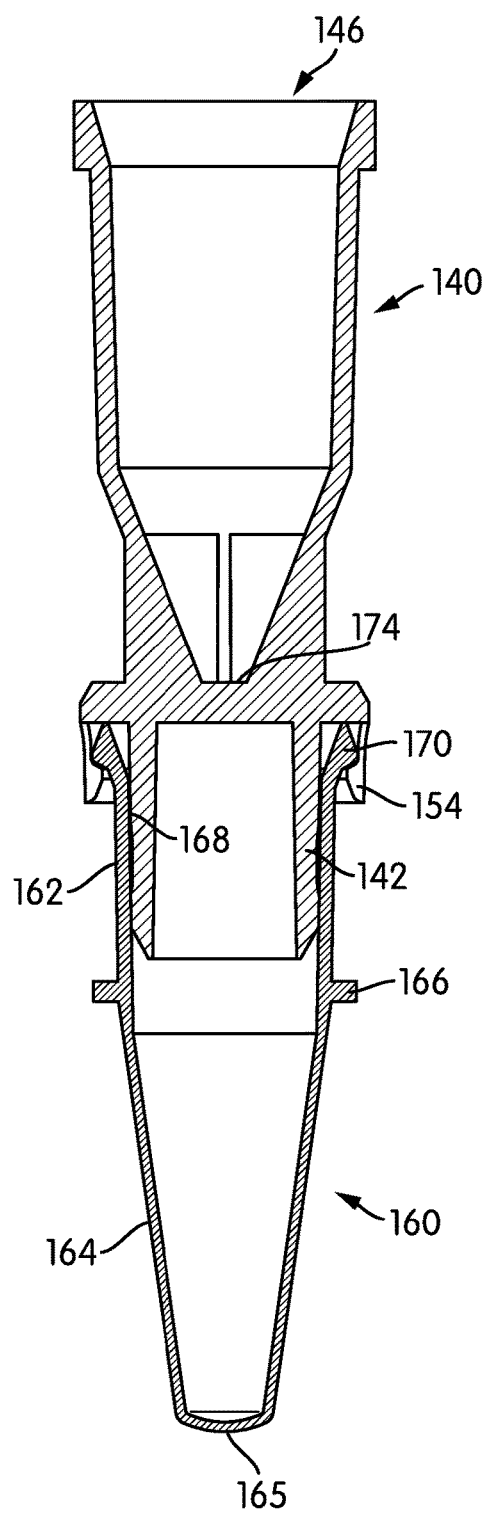
FIG. 9 is a side cross-sectional view of the cap installed in the receptacle, according to an embodiment.

FIGS. 8 and 9 illustrate an embodiment of receptacle 160 and a robotic arm, e.g., a receptacle transport mechanism.

As shown in FIGS. 8 and 9, receptacle 160 can be a vial configured to contain, for example, a sample. For example, receptacle 160 can be a single-piece vial that includes a body having a generally cylindrical upper portion 162 and a tapered lower portion 164. Formed on an outer surface of the body is a laterally-extending flange, which, in the illustrated embodiment, comprises an annular ring 166. Annular ring 166 separates the upper and lower portions 162 and 164 of the body. Upper portion 162 of the body can have an open end 172 through which fluid samples are deposited into or removed from the receptacle 160. Tapered lower portion 164 can have a closed end 165 that may either be flat or round and configured to provide optical communication with an optical system, for example, one or more optical fibers 118 of an OMD 240.

A lip 170 circumscribes open end 172 of upper portion 162 and extends radially outwardly relative to a central axis of receptacle 160. Lip 170 is configured for securable attachment to a cap 140.

Securable cap 140 can include a lower portion 142 having an outer surface configured for sealing engagement of an inner surface 168 of receptacle 160. An upper portion 144 of cap 140 includes an open end 146 for frictional attachment to a portion of a robotic arm (FIG. 8), such as a distal end portion of the robotic arm (e.g., a tubular probe of a pipettor or the prongs of a pick-and-place mechanism). Circumscribing open end 146 of upper portion 144 of cap 140 is a lip 150 extending radially outward from a central axis thereof. In such embodiments, receptacle 160 is coupled (indirectly) to the robotic arm via cap 140.

In some embodiments, cap 140 (or a removable pipette tip) is removed from distal end portion 180 of a robotic arm by means of a sleeve 186 coaxially disposed over distal end portion 180 of the robotic arm and axially movable with respect to thereto. Sleeve 186 moves axially with respect to distal end portion 180 toward a distal edge of distal end portion 180 and contacts lip 150 of cap 140, thereby pushing cap 140 off distal end portion 180 of the robotic arm.

Cap 140 can also include a flange 152 extending circumferentially around cap 140 and a plurality of locking arms 154 that extend from flange 152 toward lower portion 142 of cap 140. Locking arms 154 are configured (e.g., shaped and sized) to securely engage lip 170 of receptacle 160. Locking arms 154 may be positioned to allow for removable attachment of cap 140 to receptacle 160, while maintaining a leak-proof seal of the contents thereof. In some embodiments, flange 152 of cap 140 additionally serves to form a bottom 174 that separates upper portion 144 from lower portion 142, thereby closing the interior of the receptacle 160 from the environment when cap 140 is inserted into a receptacle 160.

As shown in FIG. 8, distal end portion 180 of robotic arm, (e.g., an automated pipettor or other pick-and-place mechanism configured to "grab" or otherwise engage a receptacle, for example, by means of an interference or frictional fit) can include one or more annular ribs 182 and 184 configured to generate a friction or interference fit between distal end portion 180 of the robotic arm and a component into which distal end portion 180 is inserted, such as cap 140 or a pipette tip (not shown).

Cap 140 and receptacle 160 be any one of the embodiments described in in U.S. Patent Application Publication No. 2014-0260118, published Sep. 18, 2014, and entitled "Interlocking Cap and Receptacle With Detent Feature and Method and Apparatus for Separating Interlocked Cap and Receptacle."

During operation, while multiple receptacles 160 are being processed and one or more OMDs 240 are measuring the intensity of signal emissions from receptacles 160, OMDs can be periodically self-checked to detect any failure or deteriorated performance, in some embodiments. Such a failure or performance deterioration can affect the accuracy of test results, which hinge on accurate measurement of optical emissions from the contents of receptacles 160. In one embodiment, self-checking is performed by placing a reference device (e.g., a reference device comprising an optical reference material such as a fluorescent thermoplastic) into an operative position of each OMD 240 (or in the case of a non-stationary OMD 240, moving OMD 240 into optical communication with a reference device), measuring the optical emission intensity from the reference device, and comparing the measured intensity to an expected intensity previously established for the reference device. A difference between the measured and expected intensities that exceeds a predetermined threshold may be indicative of failure or deteriorated performance of the signal detector. In some embodiments, an indication (e.g., a visual indication such as a warning light, graphical symbol, or text message, or an audible indication such as an alarm noise or verbal message) of failure or deteriorated performance is provided when the measured and expected intensities that exceeds a predetermined threshold. If the difference between the measured and expected intensities is within the predetermined threshold, the device may be deemed as operating properly in some embodiments.

Referring again to FIGS. 5 and 6, cover 306 may comprise a reference device in some embodiments. For example, inner surface 308 of cover 306 may be covered with, or the entire cover may be formed from, an optical reference material, such as a fluorescent thermoplastic (e.g.) PEEK.

In such embodiments, when cover 306 is in the closed position, inner surface 308 faces each of optical fibers 118. Thus, for any fibers 118 for which there is no receptacle or other emission signal source positioned thereat, inner surface 308 of cover 306 is in an optical signal-detecting position of that fiber 118 and any OMD 240 measuring the signal through that fiber 118. Thus, the optical emission detected or measured at that fiber 118 will be that of the optical reference material on inner surface 308. By taking a monitoring reference reading through one or more of fibers 118 with an OMD 240, proper performance of the OMD 240 can be confirmed and/or the signal from the OMD 240 can be calibrated against the known optical characteristics of the optical reference material on inner surface 308.

In some embodiments, the optical reference material on inner surface 308 fluoresces across the entire spectrum of anticipated wavelengths. One such optical reference material is PEEK. In such embodiments, inner surface 308 can be used to calibrate or confirm operation of each OMD 240 that is configured to detect a fluorescent signal of a different wavelength. Thus, each OMD 240 that is configured to detect emission signals of different wavelengths—and to excite such emissions with excitation signals of different wavelengths—can be calibrated and monitored with a single reference device, namely, inner surface 308 comprising the optical reference material.

The configuration of cover assembly 300 can affect the intensity of the reference signal. For example, if the height of frame 302 is such that inner surface 308 of cover 306 is at or near the focal point of the OMD 240, the intensity of the reference signal will be much higher than if inner surface 308 is not at the focal point of the OMD 240.

In some embodiment, cover 306 and inner surface 308 are previously characterized to determine an expected reference signal for each color to be detected by the OMD(s) 240 for comparison to actual signals generated by an OMD 240 detecting a fluorescent emission from inner surface 308.

Cover 306 is configured to cover all the signal coupling devices 114 when in the closed position in some embodiments. Thus, all coupling devices 114 can be simultaneously exposed to inner surface 308 or not exposed to inner surface 308 if the cover is in the open position.

In some embodiments in which cover assembly 300 includes a plurality of covers 306 instead of one cover 306 as shown in FIG. 5, each of the plurality of covers 306 can include a reference device. For example, the inner surface 308 of each cover 306 may include (covered with or formed from) an optical reference material, such as a fluorescent thermoplastic (e.g., PEEK). Each cover 306 can be configured to cover one or more, but less than all, signal coupling devices 114 when the cover 306 is in a closed position. In some multi-cover embodiments, covers 306 may be selectively and independently closed to cover certain signal coupling devices 114—or to cover a cap 140 and receptacle 160 disposed over the signal coupling devices 114.

In some embodiments, the reference device can be used to determine whether fiber 118 is obstructed by debris, in addition to confirming proper performance of OMD 240. In some embodiments, for example, OMD 240 may be operated to read an optical emission of a material having virtually no optical emission (a "null reference material"). Exemplary null reference materials include nominally non-fluorescent materials such as black polyoxymethylene (POM) (e.g., black Valox® or black Delrin® (acetal resin)). Under such circumstances, the OMD readings should be essentially null (zero). A reading that is not null, however, indicates possible contamination of OMD 240 and/or fiber 118, such as a residual material (e.g., within or at an end of a transmission fiber 118) that is fluorescing at some detectable level that would affect actual measurements by OMD 240.

In some multi-cover embodiments, one subset of covers 306 can include the reference device formed from an optical reference material, such as PEEK, and one subset of covers 306 can be formed from a null reference material.

In some embodiments, a background subtraction procedure can be performed before installing the OMD 240 into a diagnostic instrument to ensure that an emission signal generated by an OMD 240 corresponds substantially only to the optical emission being measured. Subtracting background can be advantageous when measuring wavelengths for which the emission from the optical reference material has a relatively low intensity. To subtract a background signal, a measurement can be made with OMD 240 of a null reference material. Next, a measurement can made with OMD 240 of an optical reference material. Any signal generated when measuring the null reference material is subtracted from the signal generated when measuring the optical reference material to get the "true" reading of the optical reference material. If the optical reference material is a reference device having a pre-characterized reference emission, OMD 240 can be adjusted, e.g., by adjusting a signal processing parameter, e.g., the electronic gain, as desired to get a desired reference signal from OMD 240.

In some embodiments, the reference device may be configured as a component—or in the shape of a component—that is used in conjunction with OMD 240. Such reference devices can be formed from a suitable optical reference material, such as PEEK. In this context, the reference device can have the shape of a component that is used in conjunction with OMD 24 such that the reference device can be placed in an operative, signal-detecting position of OMD 240 in the same manner as the component. For example, as shown in FIGS. 10-15, the reference device may be embodied in a reference receptacle (e.g., a vial) formed completely or partially from an optical reference material (e.g., PEEK) and configured to be connectable to a cap, such as cap 140 described above. In some embodiments, the reference receptacle and cap 140 can be manipulated (e.g., engaged, picked up, moved, disengaged, etc.) by a robotic pipettor or pick-and-place mechanism in the same manner as the receptacle 160 connected to cap 140 and placed into an operative, signal-detecting position of OMD 240 or with respect to a fiber 118 coupled to OMD 240 in the same manner that a receptacle 160 coupled to cap 140 is placed into an operative, signal-detecting position.

In some embodiments, the reference device may be configured (i.e., sized and shaped) as a receptacle that is manipulated or used in the instrument, such as a vial, tube, cuvette, a well of a microtiter plate, a cartridge, a beaker, or a chamber of a blister pack. The reference device may comprise one of multiple receptacles connected together.

Figure 12:
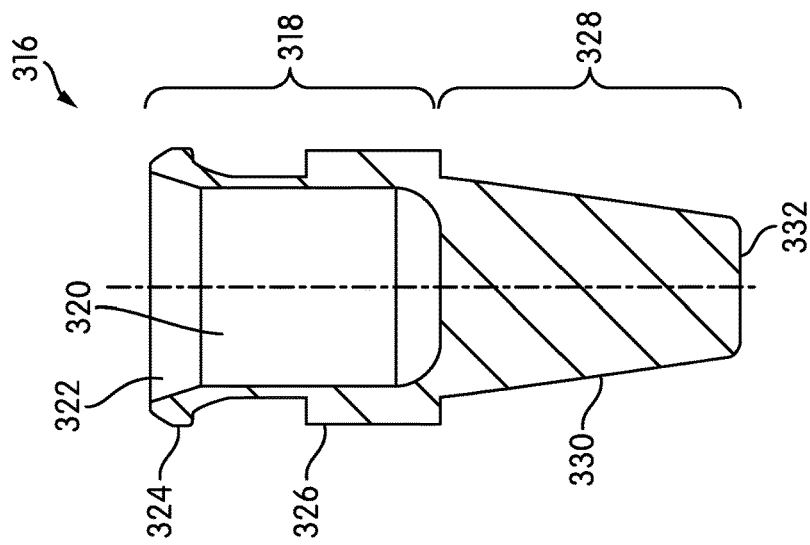
FIG. 12 is a cross-sectional view of the optical reference receptacle along the line 12-12 in FIG. 11, according to an embodiment.
Figure 11:
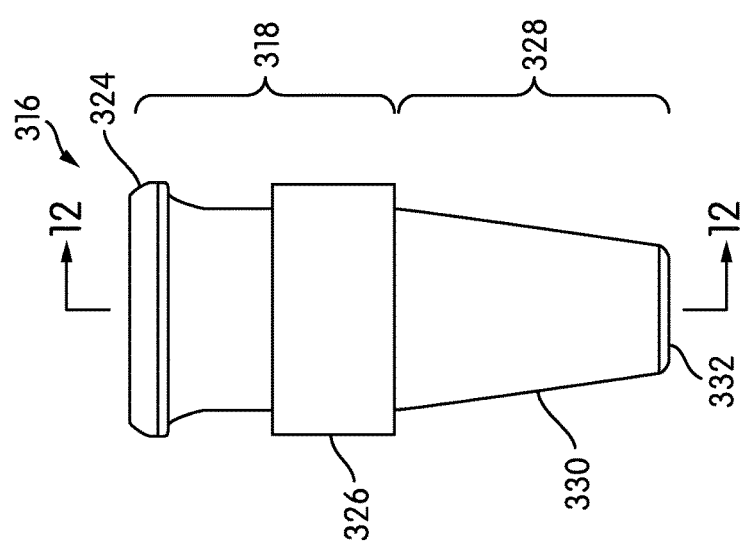
FIG. 11 is a side view of the optical reference receptacle, according to an embodiment.
Figure 10:
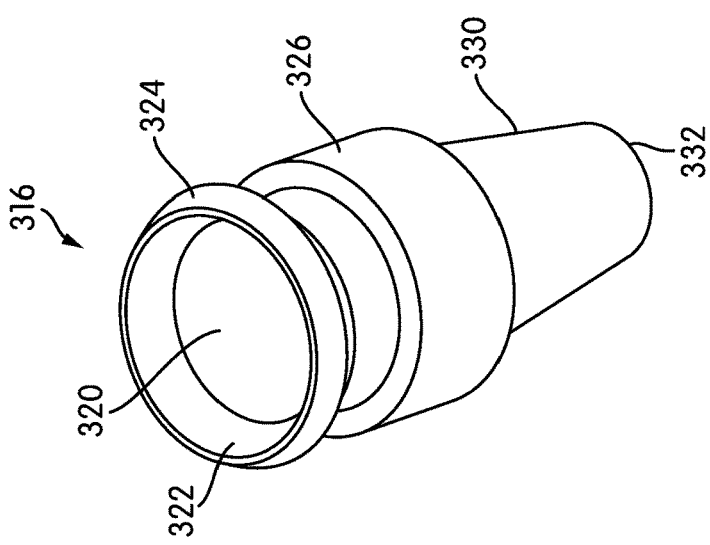
FIG. 10 is a perspective view of an optical reference standard receptacle, according to an embodiment.

FIGS. 10-12 show one embodiment of such a reference receptacle 316. As shown in FIGS. 10-12, reference receptacle 316 can be a vial and structured similar to receptacle 316 described above, in some embodiments. But in some embodiments, reference receptacle 316 may be configured not to actually hold liquid or other substance. In addition, reference receptacle 316 may comprise one of multiple receptacles connected together and formed from an optical reference material, such as PEEK. Reference receptacle 316 includes a lower portion 328 and an upper portion 318. In the illustrated embodiment, lower portion 328 comprises a tapered section 330 terminating at a blunt end 332. Upper portion 318 may include a collar 326 partially or completely surrounding upper portion 318. A blind recess 320 is formed in upper portion 318 and is configured to receive a lower portion 142 of a cap 140. A peripheral lip 324 surrounds recess 320 and a tapered opening 322 facilitates the insertion of lower portion 142 of cap 140 into recess 320, where lower portion 142 frictionally engages an inner surface of recess 320.

After being secured to cap 140, e.g., when locking arms 154 of cap 140 snap over lip 324 of reference receptacle 316, reference receptacle 316 can be indirectly and releasably coupled to a robotic arm via cap 140. Once receptacle 316 is coupled to the robotic arm, reference receptacle 316 may be moved by the robotic arm and placed in an operative position of an OMD 240 or with respect to an optical fiber 118 that is in optical communication with the OMD 240. In an exemplary embodiment, as shown in FIG. 5, reference receptacle 316 may be placed above any of signal coupling devices 114 within a compartment 305 of cover assembly 300 at the same position at which a receptacle 160 would be placed. Lower portion 328 of reference receptacle 316 may be tapered as shown at 330 to facilitate insertion of reference receptacle 316 into a receptacle holding structure and/or to conform to the shape of the receptacle holding structure, which can be sloped to receive a tapered receptacle 160, with receptacle 316 supported by collar 326 above signal coupling element 114.

In other embodiments (not shown), reference receptacle 316 can be directly and releasably coupled to a robotic arm, for example, without using cap 140.

When excited by an excitation signal emitted by an OMD 240 and transported through optical fiber 118, reference receptacle 316 will fluoresce at a predetermined wavelength and intensity. Reference receptacle 316 can be supported in an operative position of signal coupling device 114 so that an excitation signal emitted through signal coupling device 114 will impinge upon a portion of receptacle 316 (such as blunt end 332) and a portion of the emission fluorescence from reference receptacle 316 will impinge upon signal coupling device 114.

The shape of reference receptacle 316 may be altered so as to vary the position of reference receptacle 316 with respect to the focal point of OMD 240, which can vary a characteristic (e.g., intensity) of the emission signal emitted by reference receptacle 316. For example, the length of lower portion 328 may be varied to vary the distance between blunt end 332 of reference receptacle 316 and fiber 118 or signal coupling device 114. The closer blunt end 332 of reference receptacle 316 is to coupling device 114, the stronger the emission signal (i.e., greater intensity) will be received by fiber 118 and, thus, by OMD 240. In some embodiments, reference receptacle 316 of varying lengths, for example, short, medium, and long, can be prepared for generating reference emissions of increasing intensity. Thus, a geometric parameter (e.g., length, width, thickness, contour, or any other suitable geometric parameter that will affect the optical emission from the reference device) of the reference device can be varied to vary the emission signal. In some embodiments, the geometric parameter will affect the extent to which a portion of the reference device, or the amount of the reference device, that is at a focal point of OMD 240.

The optical reference material may generate emissions of different intensities at different wavelengths, and thus the shape of reference receptacle 316 may optimized for each OMD 240 configured to detect a signal at a different wavelength. Thus, for an OMD 240 configured to detect a wavelength at which the optical reference material generates an emission of high intensity, reference receptacle 316 may be configured so that it is outside of the OMD's focal point so as to modulate the emission signal and avoid a saturated reference signal. On the other hand, for an OMD 240 configured to detect a wavelength at which the optical reference material generates an emission of low intensity, reference receptacle 316 may be configured so that it is in the OMD's focal point so as to maximize the emission signal.

In some embodiments, each differently sized reference receptacle 316 can, itself, be calibrated with respect to a standard OMD, and the expected emission signal generated by that reference receptacle 316 can be recorded. The reference receptacle 316 can then be used to calibrate the signals generated by other, uncalibrated OMDs.

In some embodiments, the width or diameter of lower portion 328, for example, the diameter of blunt end 332, can be varied so as to alter the reference emission generated by reference receptacle 316.

In some embodiments, reference receptacle 316 is first characterized to determine an expected reference signal at each wavelength for comparison to actual signals generated by an OMD 240 detecting an emission from reference receptacle 316. The expected reference signals can be stored in a data file that is associated with a particular reference receptacle 316, e.g., by a unique identification of reference receptacle 316, such as a serial number or the like, and the data file can be provided with the reference device. In such embodiments, if reference receptacle 316 is replaced, e.g., because reference receptacle 316 is lost or damaged, the new data file containing the expected reference signals for the replacement reference receptacle 316 can be downloaded into the instrument.

FIGS. 13-15 show another embodiment of a reference receptacle 334. As shown in FIGS. 13-15, reference receptacle 334 can be a vial in some embodiments. As with reference receptacle 316, reference receptacle 334 may be configured not to actually contain a liquid or other substance. Reference receptacle 334 includes a lower portion 346 and an upper portion 336. In the illustrated embodiment, lower portion 346 comprises a tapered section 348. Upper portion 336 includes a collar 344 partially or completely surrounding upper portion 336. A blind recess 338 can be formed in upper portion 336 and is configured to receive lower portion 142 of cap 140. A peripheral lip 342 surrounds recess 338, and a tapered opening 340 facilitates insertion of lower portion 142 of cap 140 into recess 338. Lower portion 142 frictionally engages an inner surface of recess 338.

In some embodiments, reference receptacle 334 may be made substantially from a non-fluorescing material, such as black polyoxymethylene (POM) (e.g., black Valox® or black Delrin® (acetal resin)), but also include a portion made of a fluorescent optical reference material. For example, receptacle 334 made of a non-fluorescing material can define a channel 350 extending through all or part of lower portion 346. A piece of optical reference material (e.g., a fluorescent thermoplastic such as a PAEK thermoplastic) can be (partially or fully) inserted into the channel 350. In some embodiments, the optical reference material is a plug 352 inserted into channel 350 such that at least a portion of plug 352 is contained within channel 350.

In some embodiments, after being secured to cap 140, e.g., when locking arms 154 snap over lip 342 of reference receptacle 334, reference receptacle 334 may be moved by a robotic arm, e.g., a receptacle transport mechanism, and placed in an operative position of an OMD 240 or with respect to an optical fiber 118 that is in optical communication with the OMD 240. Referencing FIG. 5, for example, reference receptacle 334 may be placed above any of signal coupling devices 114 within compartment 305 of cover assembly 300. Lower portion 346 of reference receptacle 334 may be tapered as shown at 348 to facilitate insertion of reference receptacle 334 into a receptacle holding structure, and receptacle 334 can be supported by collar 344 above signal coupling element 114.

When excited by an excitation signal emitted by an OMD 240 and transported through optical fiber 118, reference plug 352 will fluoresce at a predetermined wavelength and intensity. Reference receptacle 334 will be supported in an operative position of signal coupling device 114 so that an excitation signal emitted from OMD 240 and through signal coupling device 114 will impinge upon reference plug 352, and a portion of the emission fluorescence from plug 352 will impinge upon signal coupling device 114.

The shape of receptacle 334, including plug 352, may be altered to vary the emission from plug 352, e.g., by varying the position of plug 352 with respect to the focal point of OMD 240. For example, the position of reference plug 352 within channel 350 can be varied. Plug 352 can be moved upwardly and away from signal coupling device 114 and fiber 118 (to thereby diminish the reference emission received by fiber 118 and, thus, by OMD 240), or plug 352 can be moved downwardly and closer to coupling device 114 and fiber 118 (to thereby strengthen the reference emission received by fiber 118 and, thus, by the OMD). The diameter of plug 352 also can be varied to further alter the emission reference signal generated by plug 352 of reference receptacle 334. A larger diameter plug will emit a larger reference emission, and a smaller diameter plug will emit a smaller reference emission.

In some embodiments, reference receptacle 334 and reference plug 352 may be first characterized to determine an expected reference signal for each wavelength for comparison to actual signals generated by an OMD 240 detecting a fluorescent emission from plug 352 of reference receptacle 334. The expected reference signals can be stored in a data file that is associated with a particular reference receptacle 334 and reference plug 352, e.g., by unique identification, such as a serial number or the like, and the data file can be provided with the reference device.

In some embodiments, a piece of optical reference material, e.g., a piece of a fluorescent thermoplastic (e.g., a PAEK such as PEEK), may be placed in a cavity (which may be otherwise empty) defined by receptacle 160 positioned in an operative position of an OMD 240 or with respect to an optical fiber 118 that is in optical communication with the OMD 240 (e.g., in a receptacle holding structure adjacent to a signal coupling device 114). Emissions from the reference material can be detected by OMD 240 for calibration and/or monitoring. The piece of optical reference material may be shaped to conform to an inner surface of the cavity of receptacle 160. For example, referencing FIGS. 8 and 9, the optical reference material can be placed in the cavity defined by lower portion 164 of receptacle 160. In some embodiments, the optical reference material may be formed in a frustoconical shape to closely conform to an inner surface defined by tapered lower portion 164. In some embodiments, the optical reference material is a disk that is sized and shaped to sit against the inner surface defined by end 165.

Figure 18:
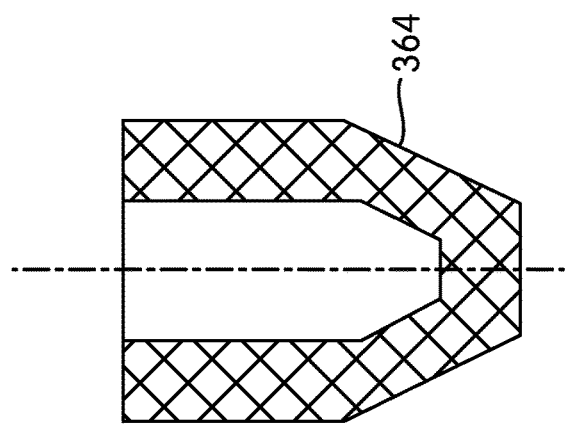
FIGS. 17 and 18 are side cross-sectional views of exemplary optical reference caps configured to be secured to an end of the robotic arm, according to an embodiment.
Figure 17:
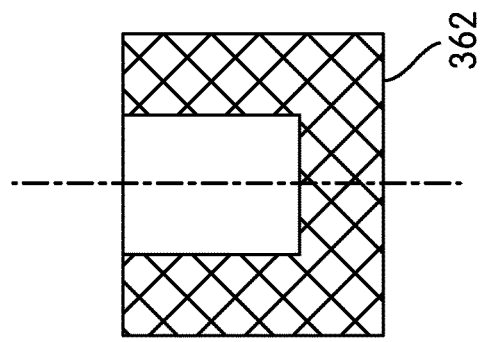
Figure 16:
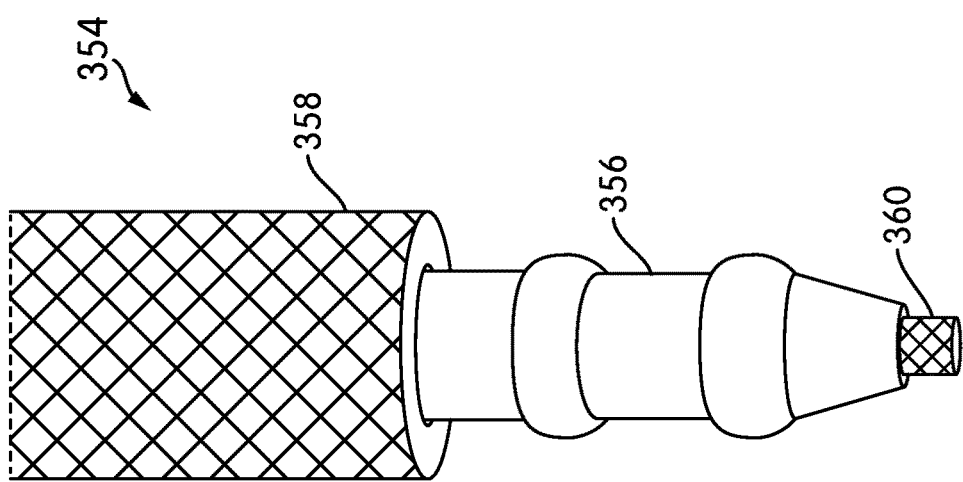
FIG. 16 is a perspective view of a portion of a robotic arm including portions formed from optical reference material, according to an embodiment.

In some embodiments, as shown in FIGS. 16-18, the reference device may be embodied in one or more portions on a robotic arm 354, e.g., an automated pipettor or receptacle transport mechanism, of an instrument (e.g., a diagnostic instrument). For example, robotic arm 354 can include a distal end portion 356. Distal end portion 356 can include a tip extension 360 at a distal edge of distal end portion 356 that is made of an optical reference material (for example, a fluorescent thermoplastic such as PEEK). Tip extension 360 can be, for example, a dowel made from an optical reference material and inserted into a channel at a distal edge of distal end portion 356. Alternatively, or in addition, robotic arm 354 can include a strip sleeve 358 made fully or partially of an optical reference material (for example, a fluorescent thermoplastic such as PEEK). For example, the distal end of strip sleeve 358 can be made from the optical reference material, or the entire strip sleeve 358 can be made from the optical reference material. Robotic arm 354 can be placed into an operative position of an OMD 240 or with respect to a fiber 118 coupled to an OMD 240, and then a reference emission generated by the optical reference material on robotic arm 354 (e.g., tip extension 360 and/or strip sleeve 358) when subjected to an excitation signal can be used to calibrate the OMD 240 or to monitor the performance of the OMD 240. In some embodiments, strip sleeve 358 can be moved axially with relative to tip 356 so that the distal end of sleeve 358 extends below tip 356, and the distal end of strip sleeve 358 can be used to generate a reference emission when robotic arm 354 is placed into an operative position of an OMD 240 or fiber 118 and is subjected to an excitation signal.

In some embodiments, tip extension 360 and sleeve 358 may be first characterized to determine an expected reference signal for each wavelength for comparison to actual signals generated by an OMD 240 detecting a fluorescent emission from tip extension 360 or sleeve 358. Again, the expected reference signals can be stored in a data file that is associated with a particular reference tip extension 360 or reference sleeve 358, e.g., by a unique identification, such as a serial number or the like, and the data file is provided with the reference device.

In another embodiment (not shown), the reference device may compose at least a portion of a pipette tip. For example, the pipette tip can be formed at least partially from an optical reference material (e.g., a fluorescent thermoplastic such as PEEK) and can be attached to distal end portion 356. Robotic arm 354 can then move the pipette tip into an operative position of an OMD 240 or with respect to a fiber 118 coupled to an OMD 240.

In some embodiments, the reference devices may be tools made from an optical reference material (e.g., PEEK) and configured to be securable to the end of robotic arm 354. For example, as shown in FIGS. 17 and 18, a blunt end reference cap 362 or a conical end reference cap 364 can each be configured to create an interference or frictional fit with tip 356 of robotic arm 354. Blunt end reference cap 362 and conical end reference cap 364 can be made fully or at least partially at a distal end of the optical reference material. Robotic arm 354 can then be used to place the reference cap 362 or 364 at an operative position of an OMD 240 or with respect to an optic fiber 118 coupled to the OMD 240 so that a signal generated by cap 362 or 364 when exposed to an excitation signal can be detected by an OMD 240. The shape of reference caps 362 and 264 can be varied to place the reference cap into a desired position of the focal point of OMD 240 so as to alter the reference emission generated thereby and thus adjust the reference signal. For example, by making the caps 362 and 364 longer or shorter, more blunt or pointed, or by varying the width of the caps 362 and 364, the reference emission can be altered and customized.

In some embodiments, caps 362 and 364 may be first characterized to determine an expected reference signal for each wavelength for comparison to actual signals generated by an OMD detecting a fluorescent emission from the caps 362 and 364. Again, the expected reference signals can be stored in a data file that is associated with the particular reference caps 362, 364, e.g., by unique identification, such as a serial number or the like, and the data file is provided with the reference device.

A reference device, such as reference receptacles 316, 334, robotic arm 354 (e.g., an automated pipettor or receptacle transport mechanism) having portions formed from an optical reference material, or caps 362, 364, can be used to ensure the proper installation of optic fibers 118 in a fiber reformatter frame 102, shown in FIGS. 1-3 and 5. As shown in the table of FIG. 4, there can be a specific mapping between fiber-positioning holes 110, 126 in base 108, 126 and the optical coupling elements 114, 132 in interface plate 112, 130 (i.e., between the first and second ends of the fibers). Since the positions of the receptacles 160 on the interface plate will be known, it is necessary that each fiber corresponds to the correct receptacle location so that the signal measured at each fiber can be associated with the correct receptacle 160. Proper positioning of the fibers can be confirmed by placing a reference device at each receptacle location, one at a time, and measuring the emission signal at the fiber that should correspond to that location. If a proper reference signal is detected, this confirms that the fiber is properly installed. If no signal is detected, this is an indication that the fibers have been crossed.

In some embodiments of multiple point calibration—i.e., calibrating multiple, e.g., 2, 3, 4, etc., different reference emission intensities—reference devices of different shapes and sizes can be used to generate the different reference emission intensities. Alternatively, calibration could be performed by some combination of reference devices comprising components configured to be used in conjunction with the OMD as well as structural components of the OMD or diagnostic instrument in which the OMD is incorporated. For example, calibration could be performed using a combination of reference receptacles 316, 334, robotic arm 354 having portions formed from an optical reference material, and/or caps 362, 364 along with a cover 306 having an inner surface 308 made from an optical reference material.

In some embodiments, calibration of OMDs (e.g., fluorometers), such as fluorometers, can be performed using a "master reference device" made from an optical reference material (e.g., PEEK) to standardize the OMD to the expected emission of the master reference device. In this context, the "master reference device" may comprise a plate or panel that can be placed in an operative, signal-detecting position of the OMD and which may comprise a part of a cover structure or other structural element of an instrument. Alternatively, the master plate could be a tool, such as a receptacle (e.g., a vial), a robotic arm (e.g., a pipettor or a receptacle transport mechanism), or a cap for a robotic arm. The "master reference device" is characterized by a standard OMD—i.e., an OMD known to be properly calibrated and functioning properly—to identify an expected reference emission signal from the master reference device that is recorded for the master reference device. A second master reference device may be characterized by the standard OMD and the expected reference emission signal for the second master reference device can be determined and recorded. To ensure that the standard OMD remains "calibrated" the standard OMD may be kept out of operational use and may be dedicated solely to characterizing master reference devices in some embodiments.

In some embodiments, to calibrate an OMD (e.g., a fluorometer) using a master reference device, an emission reading of the master reference device is taken with the OMD (optionally with background subtraction as described above) and that reading is compared to the reference emission reading recorded for the master reference device. If the actual and expected readings agree to within a predetermined threshold (i.e., the difference between the actual detected signal and the expected detected signal is within a predetermined threshold), an emission reading of the second master reference device may be taken with the OMD and that reading compared to a reference emission reading recorded for the second master reference device. If the actual and expected readings for the second master reference device agree to within the predetermined threshold, the OMD may be deemed "calibrated" or "standardized." In other embodiments, the OMD calibration may be confirmed using only one or more than two, e.g., 3, 4, or more, master reference devices.

Alternatively, if the actual and expected readings for the first master reference device do not agree to within the predetermined threshold, the reference signal of the OMD (e.g., a fluorometer) may be adjusted, for example, by adjusting variables, e.g., gains, in the signal processing electronics, until the actual and expected readings do agree to within the predetermined threshold. The reference signal of the OMD may be confirmed with a reading of the second master reference (and, optionally, third, fourth, etc. master reference devices).

The reference device, e.g., reference receptacle 316, reference plug 352, reference sleeve 358, or reference caps 362, 364 can be made from a null reference material so that the device can be used in a background subtraction procedure as described above.

Periodically, during the operational life of the OMD (e.g., a fluorometer), it may be checked against the master reference device. If the actual and expected readings agree, the OMD may be deemed to be still calibrated and operating properly. The OMD may be confirmed with one or more additional master reference devices.

If the actual and expected readings do not agree, the OMD (e.g., a fluorometer) may be checked again with the second master reference device.

If there is ever any doubt as to whether the reference emissions of the master reference devices have changed, for example if the actual and expected readings do not agree for the first master reference device, but do agree for the second master reference device (or vice versa), the master reference devices can be checked again using the standard OMD to re-characterize the master reference device or to determine if the master reference device should be replaced.

While the present disclosure has been described and shown in considerable detail with reference to certain illustrative embodiments, including various combinations and sub-combinations of features, those skilled in the art will readily appreciate other embodiments and variations and modifications thereof as encompassed within the scope of the present invention. Moreover, the descriptions of such embodiments, combinations, and sub-combinations is not intended to convey that the disclosures require features or combinations of features other than those expressly recited in the claims. Accordingly, the present invention is deemed to include all modifications and variations encompassed within the spirit and scope of the following appended claims.

The invention claimed is:

1. An optical signal detection module comprising:
   at least one optical measurement device configured to detect an optical emission signal from an emission signal source placed in a signal-detecting position of the optical measurement device;
   a cover moveable between a closed position covering the signal-detecting position and an open position not covering the signal-detecting position, an inner surface of the cover comprising an optical reference material that emits a reference emission detectable by the optical measurement device, wherein the cover is configured so that when the cover is in the closed position, the inner surface of the cover is in the signal-detecting position of the optical measurement device so that the optical measurement device detects the reference emission; and
   a holding structure configured to hold the emission signal source in the signal-detecting position of the optical measurement device, wherein the cover covers and limits access to the holding structure when the cover is in the closed position.

2. The optical signal detection module of claim 1, further comprising a drive assembly coupled to the cover and configured to move the cover between the open position and the closed position.

3. The optical signal detection module of claim 1, wherein the at least one optical measurement device comprises two or more optical measurement devices, each of the two or more optical measurement devices being configured to detect emission of a different wavelength over a range of wavelengths, wherein the optical reference material emits light over the range of wavelengths.

4. The optical signal detection module of claim 1, further comprising an optical fiber extending between the holding structure and the optical measurement device.

5. The optical signal detection module of claim 1, wherein the emission signal source comprises a receptacle containing a substance that emits an optical signal, and the holding structure comprises a receptacle holding structure configured to hold the receptacle in the signal-detecting position of the optical measurement device.

6. The optical signal detection module of claim 5, further comprising a robotic arm configured to move the receptacle into and out of the receptacle holding structure.

7. The optical signal detection module of claim 1, wherein the optical reference material comprises a fluorescent thermoplastic.

8. The optical signal detection module of claim 7, wherein the fluorescent thermoplastic is a polyaryletherketone.

9. The optical signal detection module of claim 8, wherein the polyaryletherketone is polyether ether ketone.

10. The optical signal detection module of claim 7, wherein the fluorescent thermoplastic is a polysulfone.

11. The optical signal detection module of claim 7, wherein the fluorescent thermoplastic has a repeatable light emission over a period of time.

12. The optical signal detection module of claim 7, wherein the fluorescent thermoplastic has a spatially invariant light emission.

13. The optical signal detection module of claim 1, wherein the optical measurement device comprises a fluorometer.

14. The optical signal detection module of claim 1, wherein the cover comprises a lid pivotable about a hinge axis between the open position and the closed position.

15. An optical signal detection module comprising:
a first optical measurement device configured to detect a first optical emission signal from a first emission signal source placed in a first signal-detecting position of the first optical measurement device;
a second optical measurement device configured to detect a second optical emission signal from a second emission signal source placed in a second signal-detecting position of the second optical measurement device, wherein the first and second optical measurement devices are configured to detect optical emission signals having different wavelengths;
a first cover moveable between a first closed position covering the first signal-detecting position and a first open position not covering the first signal-detecting position, an inner surface of the first cover comprising a first optical reference material that emits a first reference emission detectable by the first optical measurement device, wherein the first cover is configured so that when the first cover is in the first closed position, the inner surface of the first cover is in the first signal-detecting position of the first optical measurement device so that the first optical measurement device detects the first reference emission; and
a second cover moveable between a second closed position covering the second signal-detecting position and a second open position not covering the second signal-detecting position, an inner surface of the second cover comprising a second optical reference material that emits a second reference emission detectable by the second optical measurement device, wherein the second cover is configured so that when the second cover is in the second closed position, the inner surface of the second cover is in the second signal-detecting position of the second optical measurement device so that the second optical measurement device detects the second reference emission, wherein the first and second covers move independent of each other.

16. An optical signal detection module comprising:
at least one optical measurement device configured to detect an optical emission signal from an emission signal source placed in a signal-detecting position of the optical measurement device; and
a cover moveable between a closed position covering the signal-detecting position and an open position not covering the signal-detecting position, an inner surface of the cover comprising an optical reference material that emits a reference emission detectable by the optical measurement device, the optical reference material being a polyaryletherketone or a polysulfone, wherein the cover is configured so that when the cover is in the closed position, the inner surface of the cover is in the signal-detecting position of the optical measurement device so that the optical measurement device detects the reference emission.

17. The optical signal detection module of claim 16, wherein the optical reference material is a polyaryletherketone.

18. The optical signal detection module of claim 17, wherein the polyaryletherketone is polyether ether ketone.

19. The optical signal detection module of claim 16, wherein the optical reference material is a polysulfone.

* * * * *